US009137713B2

(12) United States Patent
Radulescu et al.

(10) Patent No.: US 9,137,713 B2
(45) Date of Patent: Sep. 15, 2015

(54) APPARATUS AND METHODS OF HAND-IN TO A FEMTO NODE

(75) Inventors: Andrei Dragos Radulescu, San Diego, CA (US); Vinay Chande, San Diego, CA (US); Jen Mei Chen, San Diego, CA (US); Sanjiv Nanda, San Diego, CA (US); Damanjit Singh, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 900 days.

(21) Appl. No.: 13/233,810

(22) Filed: Sep. 15, 2011

(65) Prior Publication Data
US 2012/0238268 A1   Sep. 20, 2012

Related U.S. Application Data

(60) Provisional application No. 61/383,715, filed on Sep. 16, 2010, provisional application No. 61/384,189, filed on Sep. 17, 2010.

(51) Int. Cl.
*H04W 36/00* (2009.01)
*H04W 52/24* (2009.01)
(Continued)

(52) U.S. Cl.
CPC ........ *H04W 36/0061* (2013.01); *H04W 52/244* (2013.01); *H04W 52/325* (2013.01); *H04W 4/08* (2013.01); *H04W 36/0083* (2013.01); *H04W 36/04* (2013.01); *H04W 84/045* (2013.01)

(58) Field of Classification Search
USPC ............... 370/328, 331, 338; 455/432.1–444
See application file for complete search history.

(56) References Cited

U.S. PATENT DOCUMENTS 8,315,208 B2   11/2012   Cho et al.
8,326,304 B2   12/2012   Kim et al.
(Continued)

FOREIGN PATENT DOCUMENTS

CN   101822091 A   9/2010
EP   2375807 A1   10/2011
(Continued)

OTHER PUBLICATIONS

Huawei, Qualcomm Incorporated, Nokia Corporation, Nokia Siemens Networks, Telecom Italia,[Change Request] CR to 25.331 on remaining open issues for support of inbound mobility in UMTS,3GPP TSG-RAN WG2 Meeting #69 R2-101754, Feb. 26, 2010,p1-p8,URL,http://www.3gpp.org/ftp/tsg_ran/WG2_RL2/TSGR2_69/Docs/R2-101754.zip.

(Continued)

*Primary Examiner* — Daniel Lai
(74) *Attorney, Agent, or Firm* — James Hunt Yancey, Jr.; QUALCOMM IP Dept.

(57) ABSTRACT

Methods and apparatuses are provided for causing active hand-in of a device from a macrocell base station to a femto node, which can be an inter-frequency hand-in. The femto node can broadcast a beacon over an operating frequency of the macrocell base station, and the macrocell base station, and/or one or more network components, can identify the femto node based on one or more parameters reported by the device from receiving the beacon. The beacon can be transmitted at varying powers to ensure active hand-in triggering, mitigate interference and/or can be powered on and off for such purposes. In addition, a macrocell base station can regulate compressed mode periods during which a device can measure the femto node based on receiving information regarding device proximity to the femto node, or a device can generate proximity indication messages base on measuring the beacon signals, etc.

47 Claims, 20 Drawing Sheets

(51) Int. Cl.
*H04W 52/32* (2009.01)
*H04W 4/08* (2009.01)
*H04W 36/04* (2009.01)
*H04W 84/04* (2009.01)

(56) References Cited

U.S. PATENT DOCUMENTS

| | | |
|---|---|---|
| 2004/0029587 A1 | 2/2004 | Hulkkonen et al. |
| 2008/0039092 A1 | 2/2008 | Kitazoe |
| 2008/0132239 A1 | 6/2008 | Khetawat et al. |
| 2009/0005105 A1* | 1/2009 | Hwang et al. .......... 455/522 |
| 2009/0097451 A1 | 4/2009 | Gogic |
| 2009/0129341 A1* | 5/2009 | Balasubramanian et al. 370/331 |
| 2009/0156165 A1 | 6/2009 | Raghothaman et al. |
| 2009/0163216 A1 | 6/2009 | Hoang et al. |
| 2009/0213819 A1* | 8/2009 | Kalhan .................. 370/338 |
| 2010/0054219 A1* | 3/2010 | Humblet et al. ......... 370/338 |
| 2010/0093358 A1 | 4/2010 | Cheong et al. |
| 2010/0120437 A1 | 5/2010 | Foster et al. |
| 2010/0124931 A1 | 5/2010 | Eskicioglu et al. |
| 2010/0150109 A1 | 6/2010 | Bradley et al. |
| 2010/0197311 A1 | 8/2010 | Walldeen et al. |
| 2010/0203890 A1 | 8/2010 | Nagaraja et al. |
| 2010/0234028 A1 | 9/2010 | Narasimha et al. |
| 2010/0242103 A1 | 9/2010 | Richardson et al. |
| 2010/0323633 A1 | 12/2010 | Pani et al. |
| 2011/0070889 A1 | 3/2011 | Li |
| 2011/0130144 A1 | 6/2011 | Schein et al. |
| 2012/0309394 A1 | 12/2012 | Radulescu et al. |
| 2013/0210436 A1 | 8/2013 | Srinivasan et al. |

FOREIGN PATENT DOCUMENTS

| | | |
|---|---|---|
| WO | WO-03094540 A1 | 11/2003 |
| WO | WO 2009047972 A1 * | 4/2009 |
| WO | WO-2009049032 | 4/2009 |
| WO | WO-2009145302 A1 | 12/2009 |
| WO | WO-2010022287 A1 | 2/2010 |
| WO | WO-2010066165 A1 | 6/2010 |
| WO | 2010093717 A1 | 8/2010 |
| WO | WO-2010093645 | 8/2010 |
| WO | 2010110240 A1 | 9/2010 |
| WO | WO-2010098104 A1 | 9/2010 |
| WO | WO20110664632 A2 | 6/2011 |

OTHER PUBLICATIONS

Huawei Technologies Co., Ltd., "Concerns on support inbound handover to CSG cells," 3GPP TSG GERAN Meeting #43 GP-091393,Sep. 4, 2009,p. 1-p. 5,URL,http://www.3gpp.org/ftp/tsg_geran/TSG_GERAN/GERAN_43_Vancouver/Docs/GP-091393.zip.

Huawei, "Support of inbound Handover for Legacy Mobile," 3GPP TSG-RAN WG3 Meeting #64 R3-091086,May 8, 2009,p. 1-p. 3,URL,http:/ /www.3gpp.org/ftp/tsg_ran/WG3_lu/TSGR3_64/Docs/R3-091086.zip.

Mitsubishi Electric, "Macro/Femto PCI split," 3GPP TSG-RAN WG3 Meeting #65 R3-091865,Aug. 28, 2009, p. 1-p. 3,URL,http://www.3gpp.org/ftp/tsg_ran/WG3_lu/TSGR3_65/Docs/R3-091865.zip.

International Search Report and Written Opinion—PCT/US2011/051961—ISA/EPO—Jan. 26, 2012.

Tiedemann E G: "Femtocell Activities in 3GPP2 TSG-C" , 3rd Generation Partnership Project (3GPP) ; Technicalspecification Group (TSG) Radio Access Network (RAN) ; Working Group 2 (WG2) , XX, XX Mar. 31, 2009, pp. 1-18, XP002599307, Retrieved from the Internet : URL:fftp://ftp.3gpp2.org/TSGX/Working/2009 /2009-03-New%200rleans/A11%20TS G%20Femto%20Discussion/XS1-20090331-004-TSG-C Femto%200 Overview-090330.p [retrieved on Sep. 2, 2010].

"Digital cellular telecommunications system (Phase 2+); Radio network planning aspects (3GPP TR 43.030 version 9.0.0 Release 9)", ETSI TR 143 030 V9.0.0 (Feb. 2010) Part D.12.2, pp. 1-44.

Taiwan Search Report—TW100133410—TIPO—Mar. 16, 2014.

3GPP TS 25.367, "3rd Generation Partnership Project; Technical Specification Group Radio Access Network; Mobility procedures for Home Node B (HNB); Overall description", Stage 2 (Release 9), V9.4.0, Jun. 2010, pp. 1-14.

3GPP TS 25.467, "3rd Generation Partnership Project; Technical Specification Group Radio Access Network; UTRAN architecture for 3G Home Node B (HNB)", Stage 2 (Release 9), V9.3.0, Jun. 2010, pp. 1-34.

* cited by examiner

APPARATUS AND METHODS OF HAND-IN TO A FEMTO NODE

CLAIM OF PRIORITY UNDER 35 U.S.C. §119

The present application for patent claims priority to Provisional Application No. 61/383,715 entitled "APPARATUS AND METHODS OF HAND-IN TO A FEMTO NODE" filed Sep. 16, 2010, and Provisional Application No. 61/384,189 entitled "APPARATUS AND METHODS OF HAND-IN TO A FEMTO NODE" filed Sep. 17, 2010, and assigned to the assignee hereof and hereby expressly incorporated by reference herein.

BACKGROUND

1. Field

The following description relates generally to wireless network communications, and more particularly to hand-in of device communications among base stations.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. In some configurations, such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

For example, such low power base stations can support hand-in of a device to/from a conventional base station (e.g., a macrocell base station). In one example, this can include active mode hand-in of a device on an active call. Such hand-in can be encumbered by some challenges. For example, in triggering of active hand-in, especially inter-frequency hand-in, there may not be a reliable trigger to initiate hand-in of the device to a low power base station. In another example, disambiguation of low power base stations can be an issue since a number of available identifiers for the base stations in a particular cell may be less than the number of base stations in the cell. Thus, the identifier alone may not be sufficient to uniquely identify a low power base station that is target of a hand-in attempt.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with generating a beacon signal at a low power base station, such as a femto node, to initiate active hand-in of a device to the low power base station. In one example, the femto node can broadcast the beacon signal in a frequency utilized by macrocell base stations so the device can detect the beacon signal. Accordingly, a device can report parameters of the femto node to a macrocell base station, and the macrocell base station can attempt to identify the femto node with or without assistance from the femto node, a gateway related to one or more femto nodes, and/or the like. Moreover, for example, the beacon signal can emulate beacon signals or other downlink transmissions used by macrocell base stations, and can thus include similar channels or other formatting parameters to facilitate detection by the devices. In addition, other parameters of the beacon signal can be managed to disambiguate beacons of various base stations, to mitigate interference caused by the beacon signal, and/or the like. Further, device considerations, such as parameters related to operating in compressed mode to measure other parameters of the femto node, can be managed to conserve resources at the device.

According to an example, a method for communicating a beacon for active hand-in is provided. The method includes transmitting a pilot signal over a femto node operating frequency and generating a beacon to facilitate active hand-in of one or more devices communicating with one or more macrocell base stations. The method further includes broadcasting the beacon over a macrocell operating frequency of the one or more macrocell base stations different from the femto node operating frequency.

In another aspect, an apparatus for communicating a beacon for active hand-in is provided. The apparatus includes at least one processor configured to transmit a pilot signal over a femto node operating frequency and generate a beacon to facilitate active hand-in of one or more devices communicating with one or more macrocell base stations. The at least one processor is further configured to broadcast the beacon over a macrocell operating frequency of the one or more macrocell base stations different from the femto node operating frequency. The apparatus also includes a memory coupled to the at least one processor.

In yet another aspect, an apparatus for communicating a beacon for active hand-in is provided that includes means for transmitting a pilot signal over a femto node operating frequency. The apparatus further includes means for generating a beacon to facilitate active hand-in of one or more devices communicating with one or more macrocell base stations, wherein the means for transmitting broadcasts the beacon over a macrocell operating frequency of the one or more macrocell base stations different from the femto node operating frequency.

Still, in another aspect, a computer-program product for communicating a beacon for active hand-in is provided including a computer-readable medium having code for causing at least one computer to transmit a pilot signal over a femto node operating frequency and code for causing the at least one computer to generate a beacon to facilitate active hand-in of one or more devices communicating with one or more macrocell base stations. The computer-readable medium further includes code for causing the at least one computer to broadcast the beacon over a macrocell operating frequency of the one or more macrocell base stations different from the femto node operating frequency.

Moreover, in an aspect, an apparatus for communicating a beacon for active hand-in is provided that includes a communications component for transmitting a pilot signal over a femto node operating frequency. The apparatus further includes a beacon generating component for generating a beacon to facilitate active hand-in of one or more devices communicating with one or more macrocell base stations, wherein the communications component broadcasts the beacon over a macrocell operating frequency of the one or more macrocell base stations different from the femto node operating frequency.

In another example, a method for identifying a femto node in a handover request is provided. The method includes receiving a handover request message comprising a primary scrambling code (PSC) utilized by a femto node to broadcast a beacon on a macrocell operating frequency and determining the femto node based in part on the PSC. The method further includes communicating the handover request message to the femto node.

In another aspect, an apparatus for identifying a femto node in a handover request is provided. The apparatus includes at least one processor configured to receive a handover request message comprising a PSC utilized by a femto node to broadcast a beacon on a macrocell operating frequency. The at least one processor is further configured to determine the femto node based in part on the PSC and communicate the handover request message to the femto node. The apparatus also includes a memory coupled to the at least one processor.

In yet another aspect, an apparatus for identifying a femto node in a handover request is provided that includes means for receiving a handover request message comprising a PSC utilized by a femto node to broadcast a beacon on a macrocell operating frequency. The apparatus further includes means for determining the femto node based in part on the PSC, wherein the means for receiving the handover request message communicates the handover request message to the femto node.

Still, in another aspect, a computer-program product for identifying a femto node in a handover request is provided including a computer-readable medium having code for causing at least one computer to receive a handover request message comprising a PSC utilized by a femto node to broadcast a beacon on a macrocell operating frequency. The computer-readable medium further includes code for causing the at least one computer to determine the femto node based in part on the PSC and code for causing the at least one computer to communicate the handover request message to the femto node.

Moreover, in an aspect, an apparatus for identifying a femto node in a handover request is provided that includes a hand-in component for receiving a handover request message comprising a PSC utilized by a femto node to broadcast a beacon on a macrocell operating frequency. The apparatus further includes a femto node disambiguating component for determining the femto node based in part on the PSC, wherein the hand-in component communicates the handover request message to the femto node.

Additionally, for example, a method for proximity indication is provided. The method includes receiving a beacon from a femto node comprising a closed subscriber group (CSG) identifier at a device and determining whether the device is a member of the femto node based in part on the CSG identifier. The method further includes indicating entering a proximity to the femto node to a radio network controller (RNC) based at least in part on the determining and a measurement of the beacon.

In another aspect, an apparatus for proximity indication is provided. The apparatus includes at least one processor configured to receive a beacon from a femto node comprising a CSG identifier and determine whether the apparatus is a member of the femto node based in part on the CSG identifier. The at least one processor is further configured to indicate entering a proximity to the femto node to a RNC based at least in part on the determining and a measurement of the beacon. The apparatus also includes a memory coupled to the at least one processor.

In yet another aspect, an apparatus for proximity indication is provided that includes means for receiving a beacon from a femto node comprising a CSG identifier and means for determining whether the apparatus is a member of the femto node based in part on the CSG identifier and performing a measurement of the beacon. The apparatus further includes means for indicating entering a proximity to the femto node to a RNC based at least in part on the determining and the measurement of the beacon.

Still, in another aspect, a computer-program product for proximity indication is provided including a computer-readable medium having code for causing at least one computer to receive a beacon from a femto node comprising a CSG identifier at a device and code for causing the at least one computer to determine whether the device is a member of the femto node based in part on the CSG identifier. The computer-readable medium further includes code for causing the at least one computer to indicate entering a proximity to the femto node to a RNC based at least in part on the determining and a measurement of the beacon.

Moreover, in an aspect, an apparatus for proximity indication is provided that includes a communications component for receiving a beacon from a femto node comprising a CSG identifier and a proximity determining component for determining whether the apparatus is a member of the femto node based in part on the CSG identifier and performing a measurement of the beacon. The apparatus further includes a parameter communicating component for indicating entering a proximity to the femto node to a RNC based at least in part on the determining and the measurement of the beacon.

In another example, a method for configuring measurement of another frequency for a device is provided. The method includes receiving a measurement report from a device comprising an identifier of a CSG and an indication that the device is a member of the CSG and configuring one or more measurement configuration parameters for the device based at least in part on the indication.

In another aspect, an apparatus for configuring measurement of another frequency for a device is provided. The apparatus includes at least one processor configured to receive a measurement report from a device comprising an identifier of a CSG and an indication that the device is a member of the CSG. The at least one processor is further configured to configure one or more measurement configuration parameters for the device based at least in part on the indication. The apparatus also includes a memory coupled to the at least one processor.

In yet another aspect, an apparatus for configuring measurement of another frequency for a device is provided that includes means for receiving a measurement report from a device comprising an identifier of a CSG and an indication that the device is a member of the CSG and means for configuring one or more measurement configuration parameters for the device based at least in part on the indication.

Still, in another aspect, a computer-program product for configuring measurement of another frequency for a device is provided including a computer-readable medium having code for causing at least one computer to receive a measurement report from a device comprising an identifier of a CSG and an indication that the device is a member of the CSG. The computer-readable medium further includes code for causing the at least one computer to configure one or more measurement configuration parameters for the device based at least in part on the indication.

Moreover, in an aspect, an apparatus for configuring measurement of another frequency for a device is provided that includes a proximity receiving component for receiving a measurement report from a device comprising an identifier of a CSG and an indication that the device is a member of the CSG. The apparatus further includes a hand-in component for configuring one or more measurement configuration parameters for the device based at least in part on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
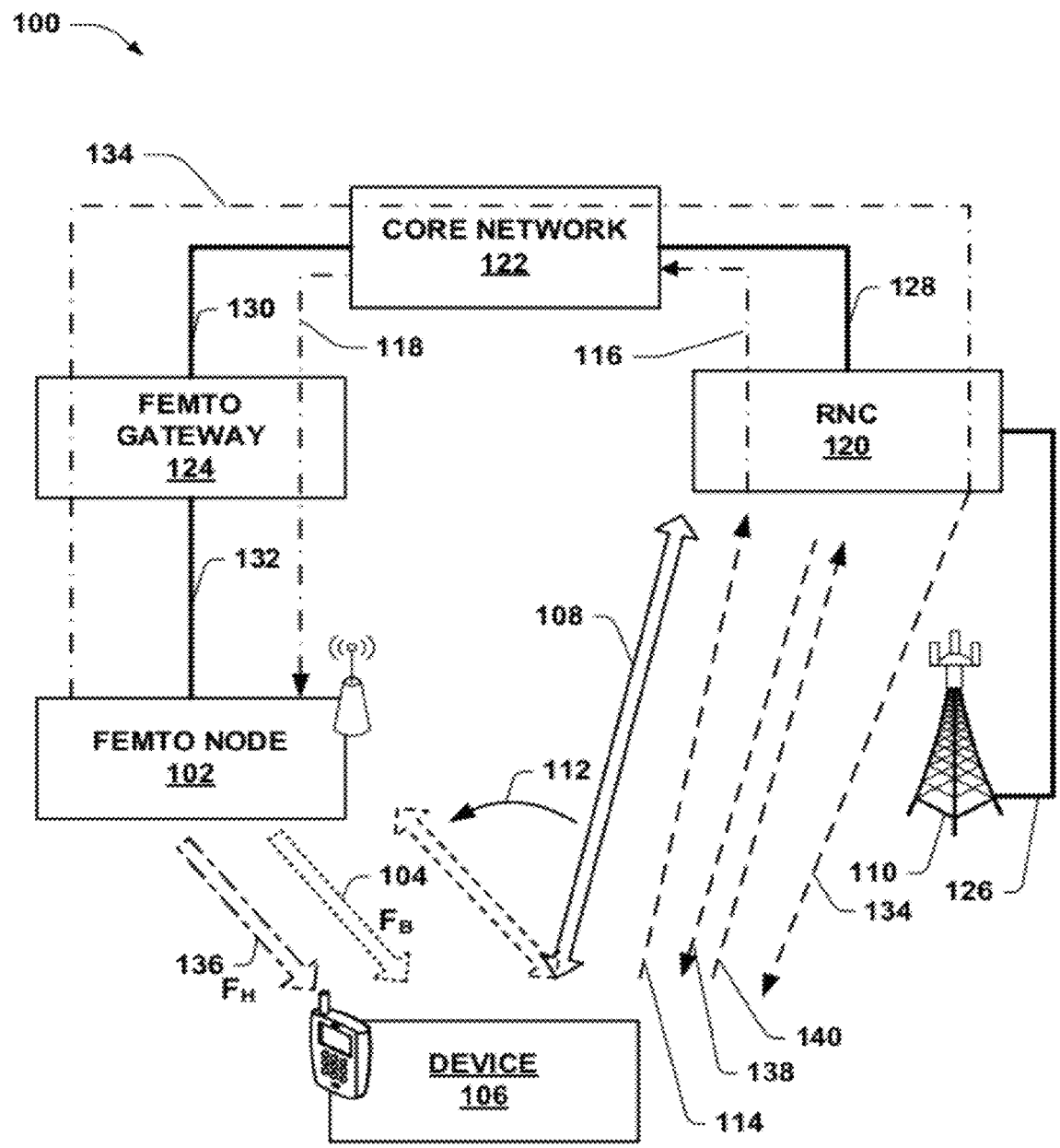
FIG. 1 is a block diagram of an example system for communicating a beacon to cause inter-frequency active hand-in for a device.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, various aspects are presented relating to generating, at a femto node, a beacon that is operable to initiate a hand-in of a device from a macrocell base station. Though described in relation to femto nodes, it is to be appreciated that the concepts herein can be utilized in conjunction with substantially any low power base station, such as a H(e)NB, picocell or microcell nodes, a relay node, etc. In addition, though active mode hand-in is contemplated, additional terms, such as handover, can be utilized herein, and both terms are meant to generally include substantially any hand-in or handover mechanisms in wireless communications. The femto node, in one example, broadcasts the beacon on a given frequency associated with the network of a macrocell base station to assist or initiate hand-in of the device. Further, in an aspect, the network can configure the device to generate a reporting message when the device detects the beacon, and the macrocell base station or corresponding network can use information in the reporting message, or in subsequent network-requested reporting messages, to trigger hand-in of the device to the femto node. Thus, the beacon of the described apparatus and methods enables the device to acquire the pilot signal of the femto node and hand-in the device or related communications (e.g., such as an active call thereof) to the femto node.

For example, in some aspects, the beacon can trigger the device (e.g., and the macrocell base station or corresponding network) to perform hand-in of the device to the inter-frequency femto node. In other aspects, for example, the beacon can trigger the device to report a proximity indication to assist in determining a femto node related to the beacon. In another aspect, for example, the beacon can cause interference to one or more devices, which can cause the network to configure the device to perform measurement reporting. In this case, the network can provide the device with information to help the device recognize a femtocell access point or related beacon, such as ranges for corresponding primary scrambling codes (PSC), so that measurements of the beacon can be reported back to the network. Such measurement reporting can include additional information to aid in handover processing.

Additionally, in further aspects, the described apparatus and methods can enable disambiguation of the femto nodes. For example, in an aspect, the network can use information in the reporting message (e.g., obtained from the beacon), such as a target cell identifier, to uniquely identify the target femto node. Additionally or alternatively, the network can provide information to the femto node or a related gateway to facilitate identifying the femto node, such as one or more PSCs, a device identity, a measurement report received from the device or one or more parameters thereof, etc.

In addition, many aspects of the beacon can be configured as described herein, such as an initial, maximum, or current power for transmitting the beacon, a time period for transmitting the beacon, etc., to manage potential interference of the beacon caused to one or more base stations or devices communicating therewith. Moreover, aspects of devices measuring femto nodes transmitting the beacon can be managed, such as compressed mode periods during which the devices can switch to an operating frequency of a femto node to perform and report measurements on the operating frequency. For example, a device can indicate proximity to a femto node, and a serving base station can accordingly schedule compressed mode while the device is within the proximity to conserve radio resources at the device.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 for beacon-driven active hand-in is illustrated. System 100 includes a femto node 102 that transmits a beacon 104 on a macro network frequency, $F_B$. System 100 also includes a device 106, which can be engaged in an active call 108 with a radio network controller (RNC) 120 via a macrocell base station 110 and can detect beacon 104. In an example, device 106 can thus initiate a hand-in 112 of device 106 communications (e.g., including active call 108) to femto node 102. In particular, upon detecting beacon 104, device 106 can generate a reporting message 114 that triggers communication of handover request messages 116 and 118 through one or more network nodes, such as RNC 120, the core network (CN) 122 (e.g., which can represent one or more nodes of a core wireless network, such as gateways, mobility management entities, supporting nodes, etc.), and a femto gateway 124 via communication links 126, 128, 130 and 132, to the femto node 102. In response, for example, femto node 102 generates a handover command message 134 that can be communicated back through the network and received by device 106.

The handover command message 134 enables device 106 to hand-in communications (e.g., including active call 108) to femto node 102. For example, the communications, including active call 108, can be carried on a femto node pilot frequency, $F_H$ 136. For example, femto node pilot frequency, $F_H$, which can be an operating frequency of the femto node 102, can be a different frequency than macro network frequency, $F_B$, used for transmitting beacon 104. Thus, beacon 104 transmitted by femto node 102 drives the hand-in 112 of communications from the macrocell base station 110 to femto node 102, even where femto node 102 operates on different frequency than the macrocell base station 110.

In one example, femto node 102 can generate beacon 104 to be similar to a beacon transmitted by macrocell base station 110 or other base stations related to CN 122. Thus, for example, the beacon 104 can include various channels utilized by beacons of base stations participating in CN 122. In another example, femto node 102 can control power of the beacon 104 to avoid interfering communications of one or more other devices to macrocell base station 110 and/or other femtocell or macrocell base stations. For instance, femto node 102 can attempt to detect such interference caused by beacon 104 and/or can receive an indication of such interference for determining a power to utilize to mitigate the interference.

It should be noted that in some aspects, after reception of message 114 from the device 106, RNC 120 can request that device 106 report additional parameters regarding the femto node 102 or corresponding beacon 104 by communicating one or more messages 138 thereto. Device 106 may then generate one or more additional reporting messages 140 to report the requested information. In one example, device 106 can acquire the additional parameters from the beacon 104 and/or by receiving other signals over an operating frequency of femto node 102. Thus, in one example, the RNC 120 can schedule compressed mode for the device 106 to measure signals from femto node 102. In one example, device 106 can indicate a proximity to femto node 102 to the RNC 120, which can cause the RNC 120 to schedule the compressed mode. For example, device 106 can indicate the proximity explicitly via a proximity message, implicitly via a measurement report message the RNC 120 interprets as proximity, etc.

In system 100, the information from message 114 and/or message(s) 140 can be used to enable identification of the proper femto node 102 detected by device 106 to continue the hand-in. For example, the disambiguation can be performed by the RNC 120, CN 122 femto gateway 124, and/or other components. As discussed further herein, such disambiguation enables a femto node 102 corresponding to the beacon 104 to be identified in areas or cells where re-use of femto node or beacon identifiers occur.

Figure 2:
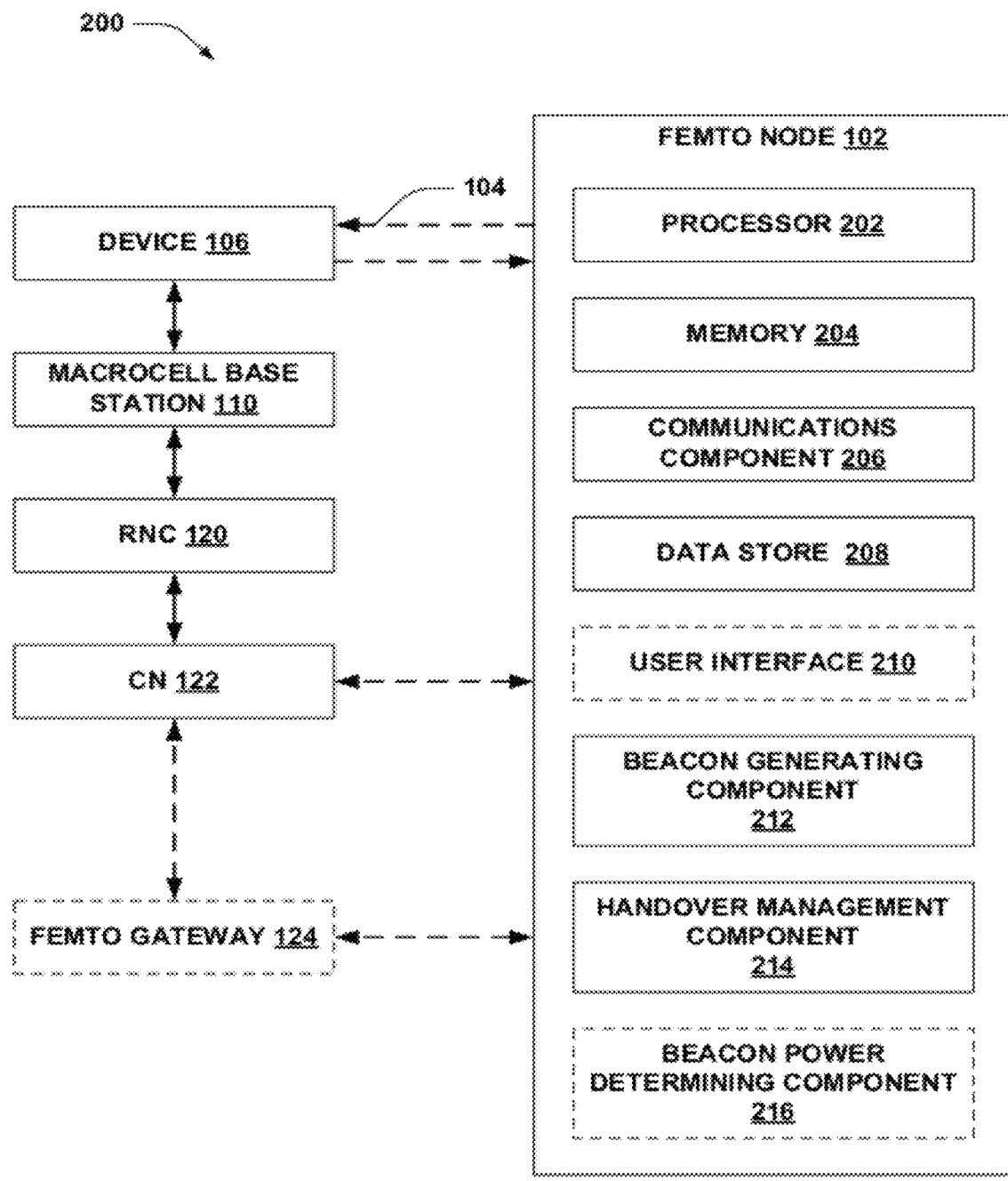
FIG. 2 is a block diagram of an example system for generating and transmitting a beacon over a macrocell frequency.

Referring to FIG. 2, a wireless communication system 200 is illustrated for causing a device to perform active hand-in to a femto node. System 200 includes a femto node 102 that can communicate one or more beacons 104 for causing one or more devices, such as device 106 to hand-in communications to the femto node 102. Device 106 can communicate with macrocell base station 110 that provides access to a CN 122 (e.g., via RNC 120). System 200 can also optionally include a femto gateway 124 that manages one or more parameters of the femto node 102 and one or more other femto nodes (not shown). Femto node 102 can include a processor 202 for carrying out processing associated with one or more of components or functions described herein. Processor 202 can include a single or multiple set of processors or multi-core processors. Moreover, processor 202 can be implemented as an integrated processing system and/or a distributed processing system.

Femto node 102 can further include a memory 204, such as for storing local applications being executed by processor 202, instructions thereof, instructions for performing one or more functions described herein, and/or the like. Memory 204 can include any type of memory usable by a computer, such as random access memory (RAM), read only memory (ROM), tapes, magnetic discs, optical discs, volatile memory, non-volatile memory, and any combination thereof.

Further, femto node 102 can include a communications component 206 that provides for establishing and maintaining communications with one or more other components of system 200, such as femto gateway 124, CN 122 (e.g., via femto gateway 124), and/or the like for example, utilizing hardware, software, and services as described herein. Communications component 206 can carry communications between components on femto node 102, as well as between femto node 102 and external devices, such as devices located across a communications network (e.g., on or more components of CN 122, device 106, etc.) and/or devices serially or locally connected to femto node 102. For example, communications component 206 can include one or more buses, and may further include transmit chain components and receive chain components, respectively including one or more transmitters and receivers, or transceivers, operable for interfacing with external devices, such as device 106.

Additionally, femto node 102 can further include a data store 208, which can be any suitable combination of hardware and/or software, that provides for mass storage of information, databases, and programs employed in connection with aspects described herein. For example, data store 208 may be a data repository for applications not currently being executed by processor 202.

Femto node 102 can optionally include a user interface component 210 operable to receive inputs from a user of femto node 102, and further operable to generate outputs for presentation to the user. User interface component 210 can include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 210 can include one or more output devices, including but not limited to a display, a speaker, a haptic feedback mechanism, a printer, any other mechanism capable of presenting an output to a user, or any combination thereof.

Additionally, femto node 102 can include a beacon generating component 212 for generating one or more beacons 104, and a handover management component 214 for performing active hand-in of a device to femto node 102. Femto node 102 can also optionally include a beacon power determining component 216 for determining and/or adjusting power for transmission of the one or more beacons 104.

According to an example, beacon generating component 212 can create a beacon 104, which can emulate downlink transmissions by base stations of CN 122 (e.g., femto node's 102 transmissions over another carrier, such as the operating frequency of femto node 102), and communications component 206 can transmit the beacon 104 over a frequency utilized by macrocell base stations in the CN 122 to cause active hand-in by device 106 or other devices. For example, beacon generating component 212 can include a pilot channel (e.g., a common pilot indicator channel (CPICH) in wideband CDMA (WCDMA)), a synchronization channel (e.g., a primary synchronization channel (PSCH), secondary synchronization channel (SSCH), etc., in WCDMA), a control channel (e.g., primary common control physical channel (P-CCPCH) in WCDMA), and/or the like within beacon 104 to emulate the macrocell base station 110 or similar beacons. In addition, the operating frequency of the macrocell base station 110 can be different from the operating frequency of femto node 102, and thus the beacon 104 transmitted on the operating frequency of macrocell base station 110 can cause an inter-frequency hand-in of device 106 served by macrocell base station 110.

Device 106 can receive beacon 104 over the macrocell base station frequency (e.g., while communicating with a macrocell base station 110), and can report one or more parameters regarding the beacon to RNC 120 in a measurement report. RNC 120, femto gateway 124, and/or one or more components of CN 122, can identify the femto node 102, as described further herein, and cause device 106 to hand-in thereto based on the measurement report. For example, handover management component 214 can obtain a handover message from RNC 120 (e.g., via CN 122 and/or femto gateway 124) that provides information related to handing-in device 106. This can be a radio access network application part (RANAP) relocation request message or similar message. Handover management component 214 can accordingly construct a radio resource control (RRC) handover command to configure device 106 to communicate with femto node 102. For example, this can include configuring the device 106 on the operating frequency of femto node 102 with the corresponding PSC for receiving signal from femto node 102, communicating the command to the device 106 (e.g., via femto gateway 124, CN 122, and/or RNC 120). RNC 120 can accordingly configure the device for handover to femto node 102 via macrocell base station 110.

In specific examples, beacon generating component 212 can broadcast the beacon 104 with a CPICH, which can include another PSC from one or more closed subscriber group (CSG) lists on the frequency of the macrocell base station 110. For example, the femto node 102 can implement restricted association such to allow access to certain devices and/or varying levels of access to certain devices, as described further herein. Beacon generating component 212 can advertise a CSG identifier based on the another PSC utilized to scramble a pilot in the CPICH of the beacon 104. The PSC of the beacon 104 can be different or the same as a PSC used by femto node 102 to communicate on an operating frequency thereof (e.g., as indicated in pilot signals over the operating frequency). In this example, device 106 can identify the CSG based on the PSC used for beacon 104 (and/or the PSC used on the operating frequency where device 106 is able to measure pilot signals on the operating frequency), and/or can include such an identity or the PSC(s) in the measurement report to macrocell base station 110.

For example, the PSC generated in the beacon 104 by femto node 102 and the PSC used by femto node 102 over its operating frequency can be the same or different PSC. In an example, a mapping of the PSC(s) to cell identifier can be stored in RNC 120, CN 122, femto gateway 124, etc., to facilitate at least partially identifying femto node 102 based on one or more of the PSCs. In one example, there can be a one-to-one mapping of PSC of beacon 104 to that of the femto node 102 over the operating frequency, a many-to-one mapping, a one-to-many mapping, etc., each of which can be associated with a cell identity of a femto node 102. Thus, in one example, the PSC for beacon 104 can be assigned (e.g., by femto gateway 124 or CN 122) to create a unique combination of beacon 104 PSC to femto node operating frequency PSC for including in the mapping to subsequently identify femto gateway 124 based on the reported PSCs.

In another specific example, beacon generating component 212 can include a P-CCPCH in the beacon 104 that can provide one or more system information blocks (SIB), master information blocks (MIB), which can include a CSG identifier, cell identifier, etc., which device 106 can utilize to report an identity related to femto node 102 in the measurement report. For example, the reported identifier can be the CSG identifier, cell identifier, etc., and/or an identifier determined based in part on the CSG identifier, cell identifier, etc.

In another example, beacon generating component 212 can control relative power levels of the individual channels (e.g., CPICH, PSCH/SSCH, P-CCPCH, etc.) within beacon 104. For example, beacon generating component 212 can increase power of the P-CCPCH to minimize time required for device 106 to receive system information. In any case, for example, upon receiving a measurement report from device 106 (e.g., via macrocell base station 110), RNC 120 can at least one of cause device 106 to hand-in to femto node 102, configure measurement configuration parameters (e.g., compressed mode parameters) for the device 106 to measure femto node 102 on the operating frequency thereof, and/or the like. Thus, where RNC 120 determines to hand-in device 106, RNC 120 can communicate one or more messages to femto node 102 to prepare for hand-in. Handover management component 214 can receive such messages from RNC 120 (e.g., via one or more components of CN 122, femto gateway 124, and/or the like), and can prepare for hand-in of device 106, as described further herein. In addition, in an example, where RNC 120 is unaware of an operating frequency of femto node 102 or one or more parameters thereof, handover management component 214 can communicate the operating frequency of femto node 102 (e.g., and/or the PSC used over the operating frequency) to RNC 120 to allow RNC 120 to prepare the device to hand-in to femto node 102.

Moreover, in an example, beacon generating component 212 can create the beacon as interference to device 106. In this example, RNC 120 can configure device 106 to generate a measurement report when signal quality of the macrocell base station 110 drops below a threshold level (e.g., similar to event 1*f,* 2*b,* 2*d,* etc. in WCDMA). When generation of the measurement report is triggered, device 106 reports, based on configuration of such measurement by RNC 120, a PSC of femto node 102 or of related beacon 104, as described, as well as additional information, such as chip-level timing information, layer-2 (e.g., media access control (MAC) layer) information like system frame number (SFN)-cell frame number (CFN), cell identity, CSG identity, other restricted association membership information, etc. For example, such information can assist in disambiguating the beacon 104 from that of other femto nodes and/or in determining access rights of the device 106 to the femto node 102.

Furthermore, beacon power determining component 216 can select a transmit power that communications component 206 can use to transmit the beacon 104 in an effort to mitigate interference to one or more devices. For example, beacon power determining component 216 can determine the power based on a received signal strength indicator (RSSI) detected on an uplink carrier before and/or during transmission of beacon 104. For example, beacon power determining component 216 can obtain the RSSI based on uplink signals received by communications component 206. In addition, beacon power determining component 216 can utilize one or more RSSI measurements to detect presence of a device, such as device 106. For example, where the RSSI is over a threshold level and/or a change in the RSSI over a period of time is at least a threshold, beacon power determining component 216 can determine that a device 106 is present. Beacon power determining component 216 can use the detected presence of the device 106 and/or the RSSI level to turn the beacon on or off, and/or to adjust power for transmitting the beacon 104.

In addition, beacon power determining component 216 can determine the threshold RSSI and/or threshold changes in RSSI based at least in part on one or more parameters relating to the macrocell base station 110 (and/or other base stations) to mitigate interference thereto. For example, beacon power determining component 216 can obtain at least one of a pathloss to macrocell base station 110, a noise rise at macrocell base station 110, a maximum downlink pilot channel power allowed at macrocell base station 110, a uplink signal-to-interference ratio (SIR) target for device 106 at macrocell base station 110, etc. Based on at least one of the foregoing, in this example, beacon power determining component 216 can set a RSSI threshold and/or a threshold for a change in RSSI over a period of time relate to adjusting the beacon 104 or turning the beacon 104 on/off to mitigate interference to macrocell base station 110 that may be caused by beacon 104.

Additionally, beacon power determining component 216 can set transmit power of beacon 104 based on one or more other parameters. For example, beacon power determining component 216 can set transmit power based on thresholds or other events configured at macrocell base station 110, such as event 1a, hysteresis, and event 2d for inter-frequency measurements in a specific WCDMA configuration. In another example, beacon power determining component 216 can determine the transmit power based at least in part on a cell individual offset (CIO) corresponding to the beacon 104. For example, beacon power determining component 216 can obtain such parameters from at least one of a measurement configuration at the RNC 120 included in RANAP hand-in or other messaging, a configuration received by one or more components of CN 122 (e.g., an operations, administration, and maintenance (OAM) server, etc.), a backhaul link to macrocell base station 110, communications with one or more devices or other over-the-air (OTA) connection, and/or the like. Moreover, beacon power determining component 216 can set a transmit power based on a type of signal detected from device 106 or one or more other devices.

In another example, beacon power determining component 216 can utilize communications component 206 to measure RSSI on multiple carriers. In this example, beacon power determining component 216 can sense device 106 presence at least in part by detecting a decrease in RSSI over one carrier and a corresponding increase in RSSI over another carrier, which can indicate inter-frequency hand-in of device 106. If the handover is detected to a carrier related to beacon 104 (e.g., RSSI of the carrier increases over a threshold level), beacon power determining component 216 can accordingly turn off and/or reduce power of beacon 104 on that carrier.

In yet another example, beacon power determining component 216 can turn on the beacon 104 and/or select a corresponding transmit power based on detecting presence of device 106. Thus, using one or more sensing mechanisms (e.g., as described above or otherwise), beacon power determining component 216 can detect presence of a device, and can accordingly set the transmit power for beacon 104 as a function of an RSSI, a measured change in RSSI over a period of time, etc. In one example, handover management component 214 can determine whether the device 106 is a member of a CSG related to femto node 102, and if not, beacon power determining component 216 can turn off or reduce the power of the beacon 104. In one example, handover management component 214 can determine such by attempting to authenticate the device 106 based on a received handover request from RNC 120. In another example, handover management component 214 can determine such based on not receiving a handover request message from RNC 120 after a period of time from detecting RSSI or change in RSSI at a threshold. For example, this can indicate that the sensed device 106 is in range of femto node 102 and receiving the beacon 104, but not attempting to hand-in to femto node 102 (e.g., because device 106 determined that it is not in the CSG).

In one example, uplink transmit power at device 106 for a voice call can be lower than that of a packet switched (PS) call or high speed uplink packet access (HSUPA) call, and thus can result in a lower RSSI increase. Thus, a given increase in RSSI detected by beacon power determining component 216 can be caused by a device in a voice call that is close to the femto node 102, or a PS/HSUPA call from a device that is farther away from femto node 102. In this example, beacon power determining component 216 can reduce power of beacon 104 by a relatively small amount such that an approaching device 106 can trigger active hand-in when at a threshold distance from femto node 102. In one example, this can result in inter-frequency hand-in attempt to another non-femto carrier by device, but can alternatively result in an active hand-in attempt by device 106 to femto node 102.

Beacon power determining component 216 can set the beacon 104 power in an attempt to at least one of mitigate interference caused by the beacon 104, maintain quality of the beacon 104, create conditions for triggering events at device 106, such as event 1a in WCDMA, or other hand-in events. Additionally, beacon power determining component 216 can configure a maximum power for beacon 104, which can be based on at least one of maintaining a desired signal strength of the beacon 104 to a certain level at a desired distance or desired pathloss. For example, beacon power determining component 216 can determine such according to parameters of nearby base stations—e.g., by measuring signal strength of nearby base stations, such as macrocell base station 110, using a network listening module (NLM), by receiving SIB parameters therefrom, and/or the like. In this regard, beacon power determining component 216 can determine different transmit powers for beacon 104 where femto node 102 is located at different positions with respect to macrocell base station 110 (e.g., such as at cell edge or cell site).

Though described in terms of sensing a device 106 based on uplink power measurements, it is to be appreciated that beacon power determining component 216 can also detect presence of a device 106 based on receiving a RANAP relocation required message therefor. In addition, in one example, upon receiving a handover message from femto gateway 124 or RNC 120 (e.g., via CN 122), handover management component 214 can determine whether femto node 102 is a candidate for hand-in of device 106. For example, this can be based in part on pathloss to macrocell base station 110 and/or device 106, a received location of device 106 (e.g., as compared to a location of femto node 102), one or more reported PSCs, measuring an RSSI to determine a presence of one or more devices (e.g., as compared to a previous RSSI or otherwise) and/or the like. In another example, determining whether femto node 102 is a candidate can be based at least in part on comparing one or more signal measurements, timing measurements or differences between that of a serving macrocell base station, timing offsets, etc. measured and reported by device 106 to known information of femto node 102, as described further herein. For example, beacon power determining component 216 can compare a reported RSSI to coverage information for femto node 102 to determine if a reported change in RSSI for a given time period is caused from the beacon 104 or other signals transmitted by femto node 102. If so, the handover management component 214 can accept the hand-in, and if not, the handover management component 214 can reject or otherwise deny the hand-in (e.g., via a rejection message, such as RANAP relocation failure message). This allows femto gateway 124, RNC 120, etc., to further disambiguate the femto node reported by device 106, as described herein.

Though described above with respect to a beacon 104 transmitted over an operating frequency of macrocell base station 110, it is to be appreciated that communications component 206 can transmit beacon 104 and/or other beacons over additional frequencies, which can correspond to operating frequencies of other base stations associated with CN 122. Communications component 206 can perform frequency hopping of the beacon 104 to hop the beacon 104 over different frequencies in different time periods. In this example, beacon power determining component 216 can also perform uplink sensing of devices over the multiple operating frequencies according to aspects described above. In one example, beacon generating component 212 can generate the beacon to cycle through frequencies in given time periods. For example, the cycle can be based at least in part on the uplink sensing performed by beacon power determining component 216, such that a frequency carrier with a low RSSI or other measurement can be selected for the beacon to mitigate interference caused to other devices. In another example, beacon generating component 212 can select a frequency carrier where an increase of RSSI is observed for the beacon, so as to trigger hand-in for a device causing the increase in RSSI on that carrier. In addition, transmission of beacon 104 can be performed periodically or aperiodically, according to one or more configurations, etc.

In addition, femto node 102 can transmit a pilot signal on its operating frequency as well, and device 106 can tune to the operating frequency of femto node 102 to additionally receive the pilot signal during one or more time periods, as described further below. In one example, communications component 206 can transmit the pilot signal using a different PSC than for beacon 104, using a different transmit power, and/or the like. In one example, a combination of the PSC of the beacon 104 and the PSC used for the pilot can be used to disambiguate femto node 102 from other femto nodes. Thus, in one example, the PSC for the beacon 104 can be assigned by femto gateway 124 or one or more components of CN 122 to facilitate the disambiguation.

Moreover, in an example, femto node 102 can be configured to provide hybrid access such to allow non-member devices to communicate in some capacity therewith. This can allow such devices to avoid interference from transmission of the beacon 104. The configuration, for example, can be based on location (e.g., femto nodes close to an enterprise entrance can be so configured since nodes further within the enterprise may not cause as much beacon interference to non-member devices outside of the enterprise). In addition, in an example, femto node 102 can operate in open access mode by refraining from transmitting a CSG in MIBs in such a case. Further, in an example, femto node 102 can transmit beacon 104 as coexistent with a cell reselection beacon used to direct idle-mode devices to discover femto node 102.

Moreover, beacon generating component 212 can set a duration of the beacon 104 to be a number of milliseconds (ms) and/or based on one or more events. For example, beacon generating component 212 can set a minimum duration as a time to identify a PSC (e.g., 800 ms) plus a time to perform system acquisition (e.g., 790 ms) plus a time to detect an incoming hand-in (e.g., 500 ms), plus an optional time for completing a hand-in, $TO_{HOacc}$. In one example, the minimum duration can be set to 2090 ms+$TO_{HOacc}$.

Figure 3:
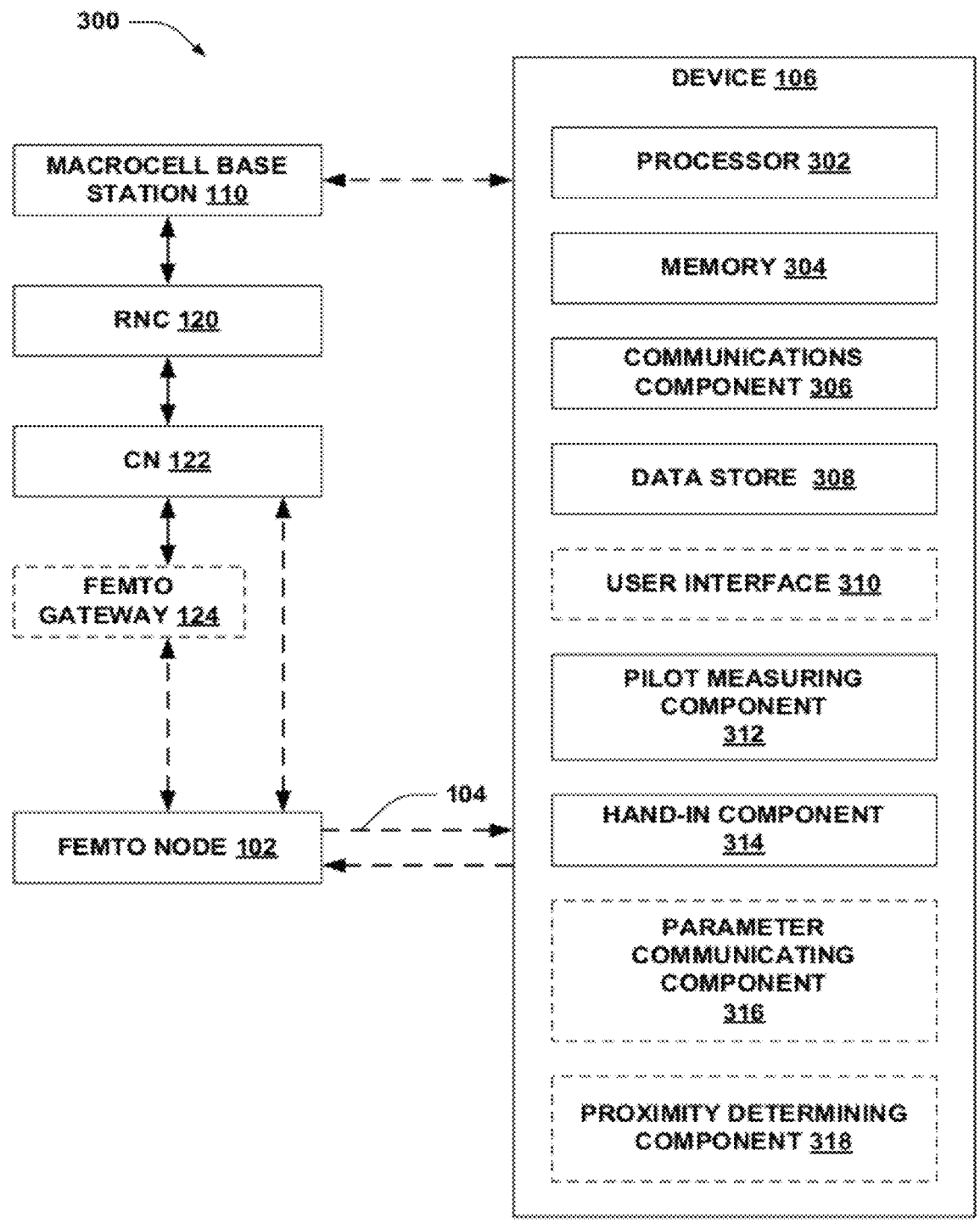
FIG. 3 is a block diagram of an example system for handing-in to a femto node.

Turning to FIG. 3, a wireless communication system 300 is illustrated for causing a device to perform active hand-in to a femto node. System 300 includes a femto node 102 that can communicate one or more beacons 104 for causing one or more devices, such as device 106 to hand-in communications to the femto node 102. Device 106 can communicate with macrocell base station 110 that provides access to a CN 122 (e.g., via RNC 120). System 300 can also optionally include a femto gateway 124 that manages one or more parameters of the femto node 102 and one or more other femto nodes (not shown). Device 106 can include a processor 302, which can be similar to processor 202, a memory 304, which can be similar to memory 204 a communications component 306, which can be similar to communications component 206 provided for establishing and maintaining communications with one or more other components of system 300, such as femto node 102, macrocell base station 110, and/or the like, a data store 308, which can be similar to data store 208, and/or an optional user interface component 310, which can be similar to user interface component 210.

Additionally, device 106 can include a pilot measuring component 312 for performing measurements of one or more pilot signals from one or more base stations, and a hand-in component 314 for reporting the measurements and/or performing one or more functions related to handing-in communications to one or more base stations. Device 106 can also optionally include a parameter communicating component 316 for receiving requests for additional parameters and/or communicating additional parameters to one or more base stations or other network components, and/or a proximity determining component 318 for determining that device 106 is within proximity of one or more femto nodes.

According to an example, communications component 306 can receive a beacon 104 from femto node 102 over a frequency used for receiving signals from macrocell base station 110 and/or other base stations in CN 122. For example, this can be in response to hand-in component 314 determining to measure signals over the frequency for hand-in in a period of time reserved or otherwise indicated by macrocell base station 110 for performing such signal measurements (e.g., based on a RRC measurement control message). Pilot measuring component 312 can perform the measurements, including measurement of beacon 104, which can emulate downlink transmissions of macrocell base station 110 or similar base stations in CN 122, and hand-in component 314 can report the measurements to RNC 120 via macrocell base station 110 (e.g., in a hand-in related measurement report). In this example, RNC 120 and/or femto gateway 124 can identify femto node 102 and/or other femto nodes based on information provided in the measurement report and/or one or more other parameters requested from device 106 (e.g., in a RRC measurement report message). In this example, RNC 120 can communicate handover messages to femto node 102 (e.g., through femto gateway 124 or otherwise), and can command device 106 to perform an inter-frequency hand-in to femto node 102 based on determining an operating frequency thereof. Hand-in component 314 can receive the command, in this example, and can tune communications component 306 to communicate with femto node 102 over the operating frequency thereof.

In another example, where device 106 supports inter-frequency hand-in, pilot measuring component 312 can measure the beacon 104 for use with proximity detection. In this example, proximity determining component 318 can determine proximity to femto node 102, and parameter communicating component 316 can signal the proximity to RNC 120. For example, proximity determining component 318 can determine the proximity based on at least one of recognizing the beacon 104, determining whether the femto node 102 is accessible by the device 106 based on an identifier in the beacon 104 (e.g., whether a CSG identifier advertised in the beacon 104 is in a whitelist of the device 106, whether the femto node 102 provide hybrid access mode), determining a location of the device and a known location of the femto node 102 (e.g., received in a network configuration or otherwise), and/or the like. For example, proximity determining component 318 can determine location of the device 106 using global positioning system (GPS), observed time difference of arrival (OTDOA) based on locations of other base stations and signals received therefrom, etc. In another example, proximity determining component 318 can recognize a cell identity of macrocell base station 110 upon communicating therewith, which can indicate proximity to femto node 102 according to one or more mappings configured in device 106. For example, the mappings can associate macrocell base stations with nearby femto nodes, and can be received from RNC 120, one or more components of CN 122, etc. The mappings can be provided to the device by RNC 120, one or more components of CN 122, based on a hardcoding or other configuration stored in device 106, etc.

While in proximity, parameter communicating component 316 can notify RNC 120 of the proximity, and RNC 120 can configure device 106 with one or more measurement configuration parameters (e.g., and/or can otherwise grant measurement gaps thereto for communicating with femto node 102). If pilot measuring component 312 is unable to detect a pilot or other signals from femto node 102, within a period of time, parameter communicating component 316 can indicate to RNC 120 that device 106 is no longer within proximity of the femto node 102, and the RNC 120 can deconfigure the one or more measurement configuration parameters. For example, this can include indicating that the device 106 is no longer granted the measurement gaps. In this regard, RNC 120 can grant measurement gaps to device 106 when in proximity of a femto node to conserve bandwidth.

In another example, as described, RNC 120 can configure device 106 to perform measurement reports when quality of a source base station drops below a threshold level, which can be based on one or more events (e.g., event 1f, 2b, 2d, etc. in WCDMA). Hand-in component 314 can receive such a configuration, and can accordingly trigger a measurement report where pilot measuring component 312 detects that the quality of a pilot from macrocell base station 110 falls below a threshold level. This can be based on performing a signal-to-noise ratio (SNR) or similar measurement of the pilot or of other signals from macrocell base station 110 received by communications component 306, and/or the like.

In addition, for example, macrocell base station 110 can configure device 106 to report one or more other parameters, such as a PSC, chip-level timing information, layer-2 information (e.g., SFN/CFN), cell or CSG identity, membership information, timing difference with respect to macrocell base station 110, etc. when communicating a measurement report. In this example, parameter communicating component 316 can receive such a configuration request, and can accordingly determine or measure the one or more requested parameters upon hand-in component 314 determining to generate a measurement report. For example, parameter communicating component 316 can determine the one or more parameters from the beacon 104, from system information (e.g., SIB) of the femto node 102, etc. In an example, parameter communicating component 316 can read SIBs or other signals of the femto node 102 from the beacon 104 on the macrocell base station 110 frequency, without need for measurement gaps. It is to be appreciated, however, that parameter communicating component 316 can read SIBs or other signals from femto node 102 during one or more compressed mode or other periods where device 106 can tune away from the macrocell base station 110 frequency to communicate with femto node 102 on the operating frequency thereof in other examples. Thus, in one example, device 106 can determine a PSC of the beacon 104 and a PSC used by femto node 102 for transmitting pilot signals on the operating frequency. It is to be appreciated that parameter communicating component 316 can communicate the additional parameters along with or following the measurement report (e.g., in a RRC measurement report message or similar message). Such parameters can be used to disambiguate the beacon 104 from other beacons, as described above and further herein.

For example, RNC 120 can configure device 106 to report a PSC used by femto node 102 upon detection thereof. For example, this can include RNC 120 transmitting a RRC measurement control message or similar message to device 106, which can include a list of PSCs corresponding to CSGs communicating on the operating frequency of macrocell base station 110 (and can in one example include a PSC utilized for communicating beacon 104, as described). In this example, parameter communicating component 316 can receive the configuration or request for PSCs. Pilot measuring component 312 can measure beacon 104 received over an operating frequency of macrocell base station 110, and can determine a PSC related to beacon 104 is in the list received in the RRC measurement control message. As described, pilot measuring component 312 can determine the PSC as that utilized to scramble beacon 104, or other information from system information related to the beacon 104, etc.

In this example, hand-in component 314 can generate a RRC measurement report message that includes a measurement of the beacon 104 (e.g., a measured SNR), and in one example, parameter communicating component 316 can include the PSC or other measured parameters in the measurement report as well. Hand-in component 314 can communicate the RRC measurement report message to RNC 120. In another example, parameter communicating component 316 can transmit the PSC to the RNC 120 in the RRC measurement report message. RNC 120, femto gateway 124, and/or one or more components of CN 122 can utilize at least the PSC to disambiguate the beacon 104 for associating with femto node 102. For example, a cell identifier, difference in observed timing, etc., of the femto node 102 can additionally or alternatively be used to disambiguate the femto node 102 corresponding to beacon 104.

In one example, femto node 102 can operate intra-frequency with macrocell base station 110. In this example, parameter communicating component 316 can read SIB from femto node 102 to determine one or more parameters thereof before being triggered by RNC 120 or based on proximity. In this example, parameter communicating component 316 can obtain a CSG identifier of femto node 102, which proximity determining component 318 can further utilize to determine whether device 106 is within proximity of femto node 102. For example, if femto node 102 advertises a CSG identifier that is not in a whitelist of device 106, parameter communicating component 316 need not notify of proximity to the femto node 102. If so, parameter communicating component 316 can indicate the proximity, and RNC 120 can trigger intra-frequency hand-in to femto node 102. For example, parameter communicating component 316 can prioritize reading of SIB of multiple femto nodes based at least in part on a cell individual offset and/or power level thereof.

Once a femto node 102 is detected for hand-in, hand-in component 314 can perform WCDMA system information acquisition, in one example, at least in part by at least one of decoding P-CCPCH time transmit intervals (TTI) until SIB3 is detected, decoding SFN, MIB, then SIB3 (e.g., possibly with multiple attempts), and/or continuously decoding P-CCPCH TTIs until MIB and/or SIB1 and/or SIB2 is detected followed by SIB3 at the scheduling interval. Hand-in component 314 can report one or more parameters of at least SIB3 information (e.g., in a measurement report or other message), as described, to RNC 120 for providing to femto node 102 (and/or femto gateway 124) to construct a hand-in command. In this example, hand-in component 314 can receive a hand-in command from the femto node 102 via RNC 120 and/or other components.

Figure 4:
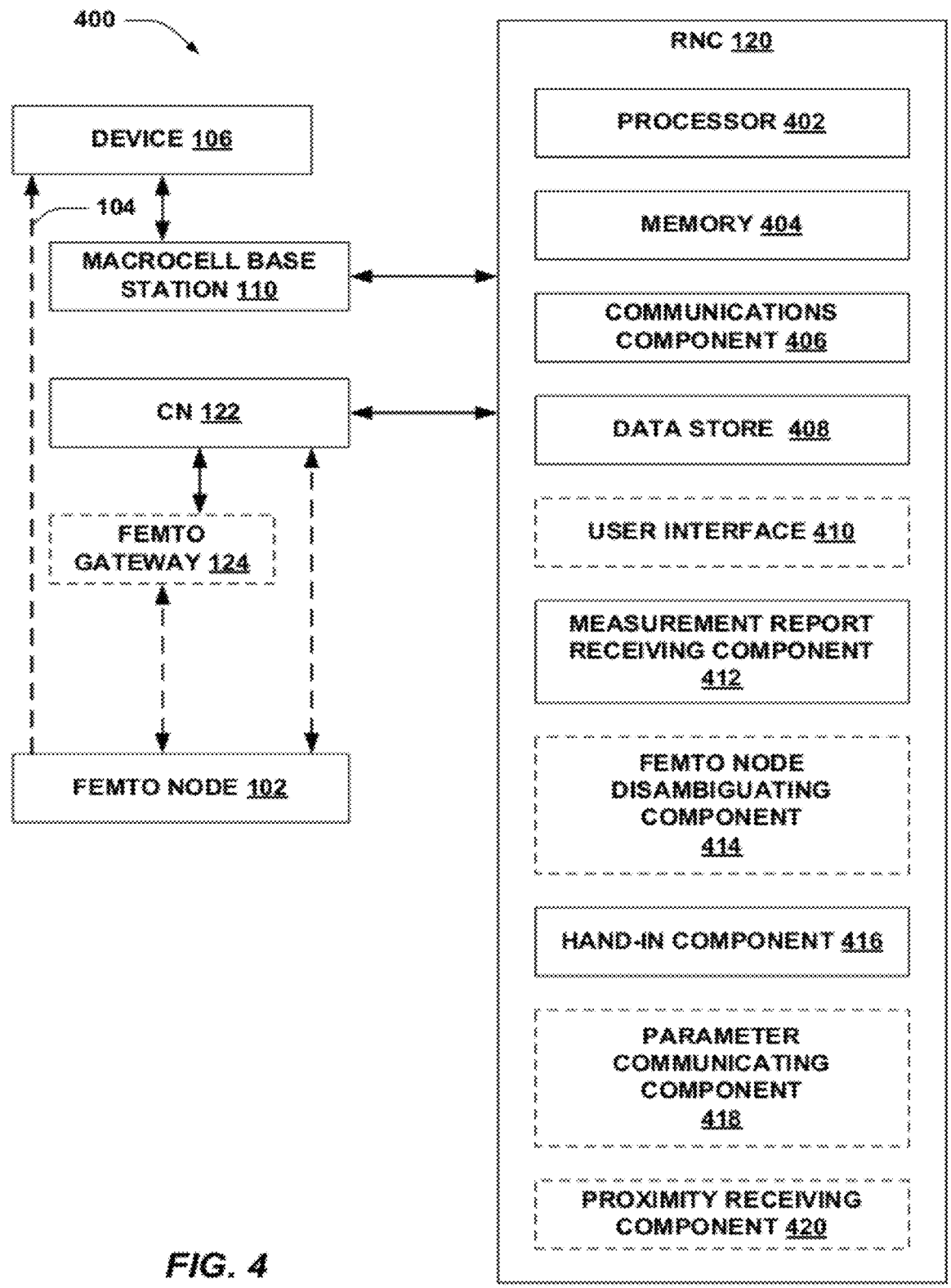
FIG. 4 is a block diagram of an example system for determining a femto node to which to transmit a handover request message.

Referring to FIG. 4, a wireless communication system 400 is illustrated for causing a device to perform active hand-in to a femto node. System 400 includes a femto node 102 that can communicate one or more beacons 104 for causing one or more devices, such as device 106 to hand-in communications to the femto node 102. Device 106 can communicate with macrocell base station 110 that provides access to a CN 122 (e.g., via RNC 120). System 400 can also optionally include a femto gateway 124 that manages one or more parameters of the femto node 102 and one or more other femto nodes (not shown). RNC 120 can include a processor 402, which can be similar to processor 202, a memory 404, which can be similar to memory 204 a communications component 406, which can be similar to communications component 206 provided for establishing and maintaining communications with one or more other components of system 400, such as macrocell base station 110, CN 122, and/or the like, a data store 408, which can be similar to data store 208, and/or an optional user interface component 410, which can be similar to user interface component 210.

Additionally, RNC 120 can include a measurement report receiving component 412 for obtaining a measurement report from device related to hand-in, an optional femto node disambiguating component 414 for identifying or at least assisting in identifying a femto node in the measurement report, and a hand-in component 416 for performing hand-in of the device to one or more femto nodes or other base stations. RNC 120 can optionally include a parameter communicating component 418 for receiving additional parameters from the device for identifying the femto node, and/or a proximity receiving component 420 for obtaining an indication that the device is within proximity of the one or more femto nodes.

According to an example, hand-in component 416 can configure device 106 to report pilot measurements of one or more beacons upon detecting that device 106 is within a threshold proximity of a base station or femto node corresponding to the one or more beacons (e.g., by communicating a corresponding RRC measurement control message thereto). Thus, for example, device 106 can receive beacon 104 from femto node 102 over the operating frequency of macrocell base station 110, measure a pilot signal in the beacon 104, and transmit a measurement report with the measurement and/or one or more other parameters to RNC 120 (e.g., in a RRC measurement report message), as described, based on determining device 106 is within a threshold proximity to femto node 102. For example, this can be based on a quality (e.g., SNR) of the beacon 104. In this example, measurement report receiving component 412 can obtain the measurement report from device 106, and hand-in component 416 can configure one or more measurement configuration parameters for device 106 to allow device 106 to switch frequencies during one or more periods to communicate with femto node 102 (e.g., to perform system information readings of femto node 102). For example, such parameters can include one or more compressed mode parameters specifying at least one or more time intervals during which the device 106 can measure other base stations or femto nodes. In a similar example, hand-in component 416 can configure device 106 to report a proximity indication instead of a measurement report, and can similarly configure compressed mode based on receiving the proximity indication.

In another example, parameter communicating component 418 can configure device 106 to report other parameters related to measured base stations, such as PSC (e.g., used for beacon 104 or one or more measured pilot signals), layer-2 information, such as SFN/CFN, cell or CSG identity, membership information, observed timing difference with respect to macrocell base station 110, and/or the like. In this example, as described, device 106 can receive the configuration, and can accordingly report the one or more parameters along with or subsequent to the measurement report. It is to be appreciated, in one example, that the parameters can be measured by the device 106 based on reading system information of the femto node 102. In either case, parameter communicating component 418 can obtain the one or more parameters, and femto node disambiguating component 414 can utilize the one or more parameters in identifying femto node 102, and/or allowing femto gateway 124 to identify femto node 102, based on the information collected and reported by device 106 from beacon 104. In another example, the parameters can be provided to the femto gateway 124 to identify femto node 102, as described herein.

In one example, device 106 can communicate a cell identity of femto node 102 (e.g., as advertised in beacon 104 or otherwise) to RNC 120 along with a measurement report including signal measurements of femto node 102 (e.g., in a RRC measurement report message). In this example, measurement report receiving component 412 can receive the measurement report and parameter communicating component 418 can receive or otherwise determine the cell identity communicated by device 106. Hand-in component 416 can determine to hand-in device 106 to femto node 102 based on measurements thereof in the measurement report, and can include the cell identity in one or more handover messages to CN 122 and/or femto gateway 124 (e.g., in a RANAP relocation required message). In this regard, one or more components of CN 122 and/or femto gateway 124 can disambiguate the femto node 102, and can communicate the handover messages thereto to facilitate hand-in of device 106 thereto.

In another example, a PSC of beacon 104 can be mapped to a cell identity of femto node 102, and such a mapping can be received and/or stored by femto node disambiguating component 414. For example, femto node disambiguating component 414 can obtain one or more mappings from one or more components of CN 122, femto node gateway 124 that can assign the PSCs, femto node 102, and/or other components. Thus, device 106 can determine and communicate a PSC of beacon 104, as described, parameter communicating component 418 can obtain the PSC from device 106, and femto node disambiguating component 414 can identify femto node 102 using the obtained PSC (e.g., based on the mapping). In another example, parameter communicating component 418 can obtain a PSC of a pilot signal of femto node 102 from device 106. In this example, the PSC of beacon 104 in combination with the PSC of the pilot signal can be used in the mapping to determine a cell identity. For example, the combination can be a Cartesian product of the PSCs, and/or the like. In another example, hand-in component 416 can communicate the one or more PSCs to femto gateway 124 or CN 122 component for determining the cell identifier based on the mapping.

In yet another example, parameter communicating component 418 can obtain a measurement report message from the device 106 corresponding to the femto node 102 in a handover message to CN 122 or femto gateway 124. CN 122 or femto gateway 124 can use the measurement report message to similarly attempt to identify femto node 102 based on information regarding the respective beacon 104. In any case, hand-in component 416 can receive an operating frequency of femto node 102 (e.g., and/or a PSC utilized by femto node 102 over the operating frequency), and can accordingly prepare the device 106 for hand-in to the femto node 102 (e.g., by causing device 106 to tune its receiver to the operating frequency for signals using the PSC).

In an example, device 106 can indicate proximity to femto node 102 to RNC 120. In this example, proximity receiving component 420 can obtain the indication, and hand-in component 416 can configure one or more measurement configuration parameters for device 106 to allow device 106 to measure femto node 102 during a time period (e.g., in compressed mode). In a similar example, device 106 can indicate leaving proximity of femto node 102 to RNC 120, in which case hand-in component 416 can deconfigure the one or more measurement configuration parameters (e.g., to cease using compressed mode), which can conserve radio resources.

Figure 5:
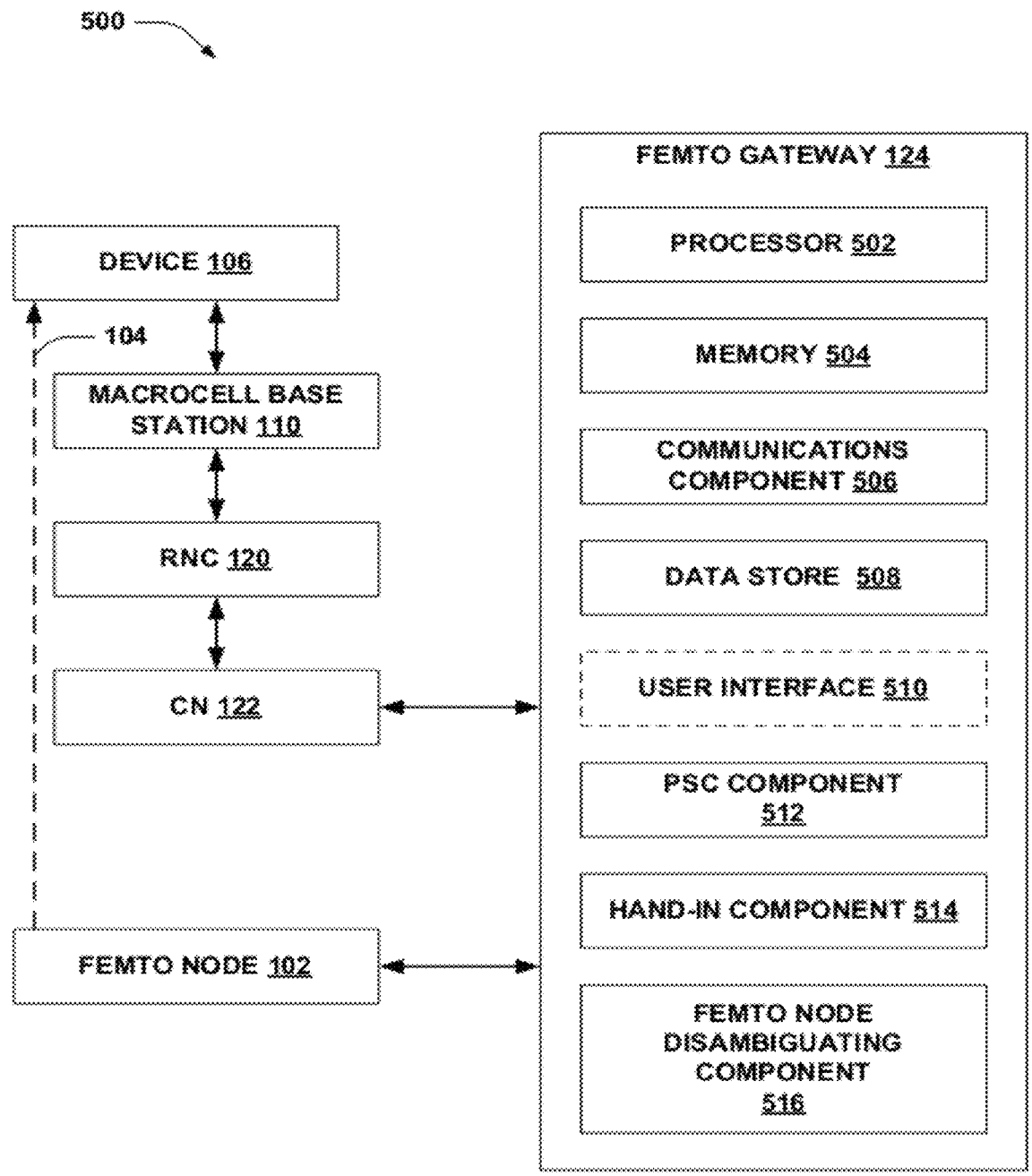
FIG. 5 is a block diagram of an example system for disambiguating a femto node to receive a handover request message.

Turning to FIG. 5, a wireless communication system 500 is illustrated for causing a device to perform active hand-in to a femto node. System 500 includes a femto node 102 that can communicate one or more beacons 104 for causing one or more devices, such as device 106 to hand-in communications to the femto node 102. Device 106 can communicate with macrocell base station 110 that provides access to a CN 122 (e.g., via RNC 120). System 500 also includes a femto gateway 124 that manages one or more parameters of the femto node 102 and one or more other femto nodes (not shown). Femto gateway 124 can include a processor 502, which can be similar to processor 202, a memory 504, which can be similar to memory 204 a communications component 506, which can be similar to communications component 206 provided for establishing and maintaining communications with one or more other components of system 500, such as femto node 102, CN 122, and/or the like, a data store 508, which can be similar to data store 208, and/or an optional user interface component 510, which can be similar to user interface component 210.

Additionally, femto gateway 124 can include a PSC component 512 for managing one or more PSCs and/or other parameters (e.g., chip-level timing, frame timing, cell identity, etc., as described above) of one or more femto nodes, a hand-in component 514 for facilitating hand-in of a device to the identified femto node, and a femto node disambiguating component 516 for identifying a femto node based on one or more PSCs or other identifiers.

According to an example, hand-in component 514 can obtain a handover message from RNC 120 via CN 122 that identifies a femto node 102 to which device 106 is to be handed-in. For example, the handover message can include an identifier of the femto node 102, which can be a cell identifier, a PSC of a transmitted beacon 104, a PSC of a pilot signal transmitted by femto node 102, a CSG identifier, layer-2 information, etc., as described. The handover message can include a RANAP relocation request or similar message. Femto node disambiguating component 516 can identify the femto node 102 based on the identifier, and hand-in component 514 can forward the handover message or a different handover message (e.g., RANAP relocation required) thereto to facilitate hand-in of device 106. In this example, as described, femto node 102 can prepare a command to switch device 106 to an operating frequency of femto node 102, and can provide the command to femto gateway 124 for communicating to RNC 120.

In one example, PSC component 512 can assign or otherwise receive an indication of a PSC utilized by femto node 102 to transmit a beacon 104. Thus, PSC component 512 can store a mapping of PSC to cell identifier such that femto node disambiguating component 516 can subsequently identify femto node 102 based on a PSC reported for beacon 104. In another example PSC component 512 can assign or otherwise receive an indication of a PSC used by femto node 102 for transmitting a pilot signal in an operating frequency of femto node 102. Thus, PSC component 512 can store a cell identity that corresponds to a combination of the PSCs (e.g., a Cartesian product thereof) for subsequently identifying femto node 102 based on reported PSCs. Moreover, PSC component 512 can store other observed or received information regarding femto node 102 and/or other femto nodes, such as chip-level timing, frame timing, cell identifiers, etc. In one example, PSC component 512 can communicate such mappings to one or more other nodes, such as RNC 120 for disambiguating femto nodes from reported PSCs or other parameters.

Where the identifier received in the handover message (e.g., the identifier and/or other information reported by the device 106) does not uniquely match a femto node, femto node disambiguating component 516 can utilize additional information to identify a femto node to which device 106 is to be handed-in. For example, femto node disambiguating component 516 can determine with which of a set of possible femto nodes corresponding to provided identifiers or other information the device 106 is allowed to communicate (e.g., based on CSG identifier). If one femto node 102 results, this can be the femto node to which hand-in component 514 communicates the handover message. In another example, the device 106 can send a RRC measurement report message to RNC 120, which can be included in the handover message. In this example, femto node disambiguating component 516 can determine which of a set of possible femto nodes may have a reported time difference of arrival with respect to macrocell base station 110 or one or more other reported base stations, an absolute time, a cell coverage, a RF pattern matching, etc.

If femto node disambiguating component 516 cannot determine a single femto node 102 (or otherwise does not so determine), hand-in component 514 can communicate the handover message to multiple femto nodes, such as femto node 102, which can accept or deny the hand-in. In the instance of multiple accepting femto nodes, hand-in component 514 can communicate related handover commands to macrocell base station 110, which can further attempt to select a femto node 102 based on other information available (e.g., uplink RSSI as measured against coverage information for the femto nodes, signal timing, etc.), as described.

Figure 6:
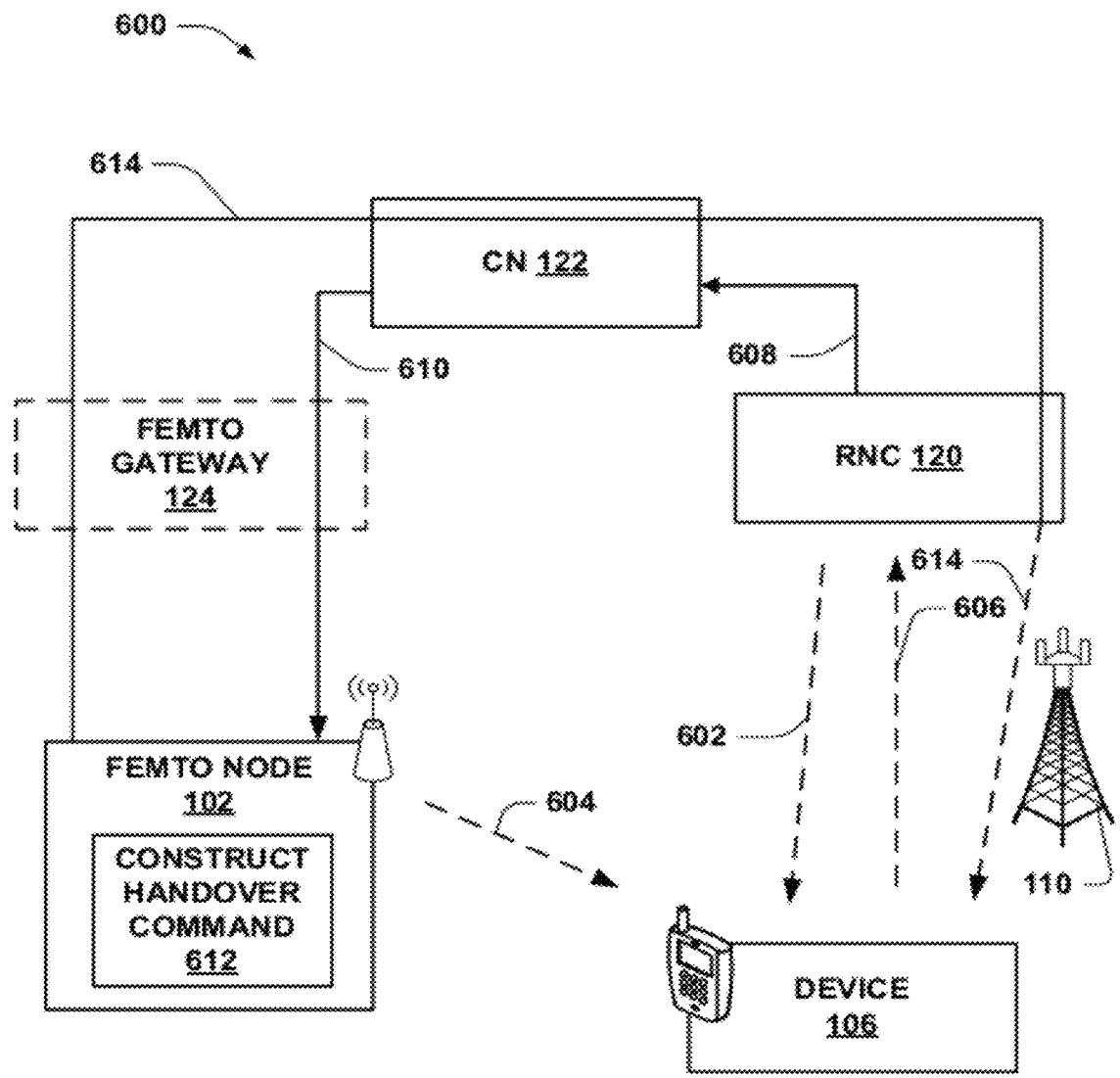
FIG. 6 is a block diagram of an example system for facilitating active hand-in of a device to a femto node for which a measured beacon is reported.

FIG. 6 illustrates an example system 600 for causing active hand-in signaling based on transmitting a beacon. System 600 includes a femto node 102, device 106, macrocell base station 110, RNC, 120, CN 122, and an optional femto gateway 124, which can communicate as described above.

In a specific example, (e.g., for devices that are pre-Release 9 of WCDMA), RNC 120 can transmit a RRC measurement control message 602 to device 106 to setup event 1a/1d for device 106 to report when encountering a PSC that may belong to a femto node, such as femto node 102. In one example, the RRC measurement control message 602 can indicate to device 106 to report a timing difference (e.g., based on SFN) between a measured femto node and one or more other base stations. Device 106 can then detect beacon 604 from femto node 102, which can be broadcast on the operating frequency of macrocell base station 110, as described. In one example, device 106 can determine femto node 102 is associated with a CSG in a list received from one or more components of CN 122. For example, device 106 can determine the CSG of femto node 102 based on determining a CSG from a PSC related to the beacon 604, a CSG identifier in the beacon 604, etc. Moreover, for example, device 106 can read a broadcast channel (BCCH) to decode a SFN.

Device 106 can generate a measurement report, which can include identifying information of femto node 102, such as a CSG identifier, PSC, etc., and/or a timing difference with respect to the macrocell base station 110 (e.g., based on SFN), for example. Device 106 can transmit the measurement report in a RRC measurement report message 606 to RNC 120 (e.g., via macrocell base station 110). In an example, an event 1a/1d can be triggered at the device 106 based on measurement of beacon 604, and device 106 can communicate the measurement report based on the event. RNC 120 can then transmit a RANAP relocation required message 608 to CN 122, which can include information received in the RRC measurement report message 606, such as PSC of the femto node 102 (e.g., or an identifier corresponding to the PSC), timing difference, etc.

In one example, RNC 120 can populate a cell identifier field of the RANAP relocation required message with the PSC, or a value computed as a function thereof. In one specific function, fake-UC-Id can be a 28-bit integer with:
i) fake-UC-Id[28:17]=RNC-id of femto gateway 124 (12-bit, configured in RNC operation support system (OSS))
ii) fake-UC-Id[9:1]=g(PSC) (9-bit, configured in RNC OSS), where g is a one-to-one 9-bit function
iii) fake-UC-Id[16:10]=0000000$_b$ In this regard, the fake-UC-Id used as the cell identifier in the RANAP relocation required message can be matched by femto gateway 124 against femto node 102 advertising characteristics encoded by the function. For example, the femto gateway 124 can match fake-UC-Id with the femto nodes whose beacons may have triggered (e.g., where the beacons include the PSC index at fake-UD-Id[9:1]).

Moreover, in one example, the RANAP relocation required message 608 can include at least a portion of the RRC measurement report message 606, which can allow femto node 102 to set an initial power for communicating with device 106 following hand-in. CN 122 can communicate a corresponding RANAP relocation request message 610 to femto node 102, optionally through femto gateway 124 which can determine femto node 102 based on information in the RANAP relocation request message 610, as described. For example, the RANAP relocation request message 610 can include parameters from the received RANAP relocation required message 608. In this example, femto node 102 can construct a handover command 612 based on the RANAP relocation request message 610, and can communicate the handover command 612 to RNC 120, as shown at 614, and back to device 106 to facilitate hand-in to femto node 102.

It is to be appreciated, as described, that femto node 102 can perform additional functions to determine whether to construct handover command 612 or to deny the RANAP relocation request from CN 122 (e.g., by sending a RANAP relocation failure or similar message). For example, upon receiving RANAP location request message 610, femto node 612 can determine whether device 106 is detected to determine whether femto node 102 is to be the target for hand-in. Where a RRC measurement report message is received in the RANAP relocation request message 610, femto node 102 can determine an OFF and timing measurement ($T_m$) reported in the cell synchronization information element of the RRC measurement report message reported for femto node 102 and/or RNC 120. For example, OFF=(SFN−CFN$_{Tx}$) mod 256, where SFN−CFN is the observed time difference to macrocell base station 110 defined as OFF×38400+$_{Tm}$, and $T_m=(T_{UETx}-T_1)-T_{RxSFN}$. For each pair of nodes for which the above is reported, femto node 102 can calculate $T_{RxSFN}=\{(OFF_{CELL1}-OFF_{CELL2})\times38400+(T_{m,CELL1}-T_{m,CELL2})\}$ mod (38400×256). If the computed $T_{RxSFN}$ is has a probability beyond a threshold of indicating femto node 102, in this example, femto node 102 can construct the handover command 612 to hand-in device 106 to femto node 102.

In WCDMA, a clock of femto node 102 and RNC 120 can drift apart by up to 1.34 chips per second. In addition, device 106 can receive signals from femto node 102 over multiple paths, which, in many cases, can result in delay of up to ±40 chips. Given a number of refreshes per hour performed by femto node 102 to synchronize timing, the following table displays uncertainty that a computed $T_{RxSFN}$ matches femto node 102, for example.

| Refresh rate (per hour) | Drift Uncertainty | Multipath Uncertainty | Total Uncertainty | Discernable $\Delta T_{RxSFN}$ values (if only lower 8 bits of SFN are considered, otherwise multiply by 16) | Comments |
|---|---|---|---|---|---|
| 1 | 4825 | 40 | 4865 | 1010 | Hourly Updates |
| 2 | 2413 | 40 | 2453 | 2004 | |
| 3 | 1609 | 40 | 1649 | 2981 | |
| 4 | 1207 | 40 | 1247 | 3943 | |
| 5 | 965 | 40 | 1005 | 4888 | |
| 6 | 805 | 40 | 845 | 5819 | |
| 7 | 690 | 40 | 730 | 6735 | |

| Refresh rate (per hour) | Drift Uncertainty | Multipath Uncertainty | Total Uncertainty | Discernable $\Delta T_{RxSFN}$ values (if only lower 8 bits of SFN are considered, otherwise multiply by 16) | Comments |
|---|---|---|---|---|---|
| 8 | 604 | 40 | 644 | 7636 | |
| 9 | 537 | 40 | 577 | 8523 | |
| 10 | 483 | 40 | 523 | 9397 | Updates every six minutes |
| 60 | 81 | 40 | 121 | 40598 | Updates every minute |

Thus, femto node 102 can determine whether it is the target based on the above table and whether a measured difference for $T_{RxSFN}$ is within the certainty based on the refresh rate. In another example, femto node 102 can communicate the $T_{RxSFN}$ (e.g., actual, expected, or uncertainty) to femto gateway 124 in the handover command so femto gateway 124 can determine whether femto node 102 is to be the target. If so, femto gateway 124 can forward the handover command to device 106 through the various nodes. If not, femto gateway 124 can determine if another femto node responds with similar values for determining a target femto node. In another example, where multiple handover commands are received, femto gateway 124 can select the femto node 102 with the highest probability of being the target based on a most desired value for $T_{RxSFN}$.

Moreover, for example, where device 106 measures beacon 604 during a compressed mode measurement gap along with a pilot from femto node 102 (e.g., which can be indicated in the RRC measurement report message 606 by device 106 and/or in the RANAP relocation required 608 from RNC 120), femto node 102 can match $T_m$ between the beacon 604 and pilot.

In another specific example, (e.g., for devices that are Release 9 of WCDMA), RNC 120 can configure device 106 to acquire intra-frequency system information during certain time intervals using a RRC measurement control message 602. As described, device 106 can thus detect beacon 604 and can transmit a proximity indication 606 to RNC 120 comprising a CSG identifier in beacon 604, a PSC, and/or the like. Regardless of whether proximity indication is performed, device 106, RNC 120, and CN 122 can utilize Release 9 intra-frequency procedures for hand-in, while femto node 102 uses inter-frequency procedures to cause device 106 to hand-in on the operating frequency of femto node 102 and not the frequency corresponding to beacon 604. Thus device 106 is not required to communicate in compressed mode to measure inter-frequency pilot signals of other femto nodes.

Referring to FIGS. 7-10, example methodologies relating to communicating a beacon to facilitate active hand-in are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 7:
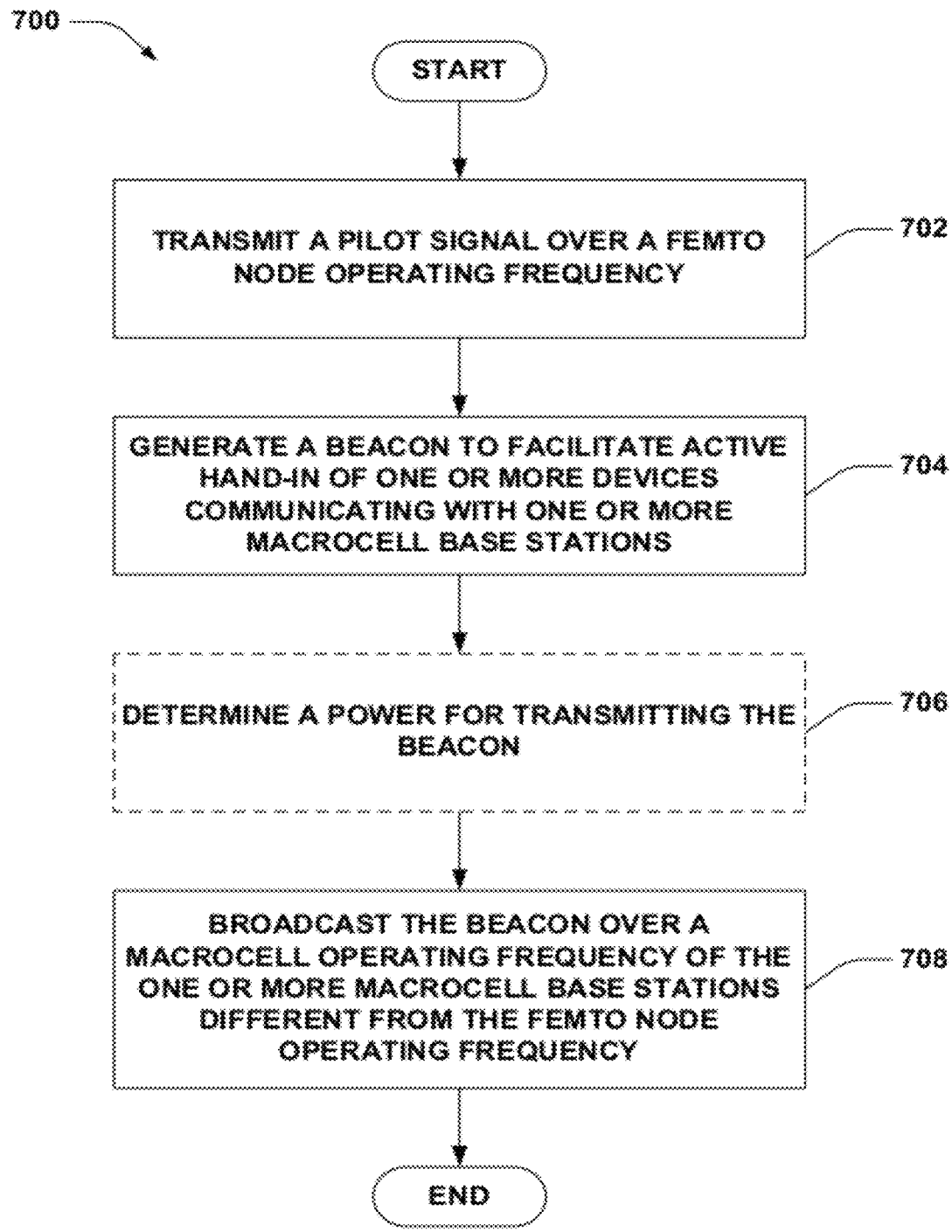
FIG. 7 is a flow chart of an aspect of an example methodology for generating a beacon for transmitting for a femto node over a macrocell operating frequency.

Referring to FIG. 7, an example methodology 700 is displayed that facilitates broadcasting a beacon to facilitate active hand-in. At 702, a pilot signal can be transmitted over a femto node operating frequency. For example, the pilot signal can include parameters for acquiring system access and/or identifying a source of the pilot signal. At 704, a beacon can be generated to facilitate active hand-in of one or more devices communicating with one or more macrocell base stations. For example, the beacon can be generated to emulate downlink transmissions by cells in a wireless network (e.g., including similar channels, etc.). In addition, in an example, the beacon can include a PSC to facilitate identifying a source of the beacon. The PSC can have been assigned by a femto gateway in one example to facilitate identifying the source of the beacon at the femto gateway or other wireless network components. Optionally, at 706, a power can be determined for transmitting the beacon. For example, the power can be an initial power, a maximum power, and/or a current power.

The power can be determined based on sensing presence or potential interference to one or more devices. For example, as described, this can be based on one or more parameters or measurements, such as a RSSI measured over the macrocell operating frequency (e.g., compared to a previous RSSI, compared to an RSSI of another frequency to detect hand-in of a device to the other frequency, and/or the like), a measured signal strength of one or more other base stations, and/or the like. At 708, the beacon can be broadcast over a macrocell operating frequency of the one or more macrocell base stations different from the femto node operating frequency. Thus, the beacon can facilitate active mode hand-in of one or more devices communicating with a macrocell over the macrocell operating frequency.

Figure 8:
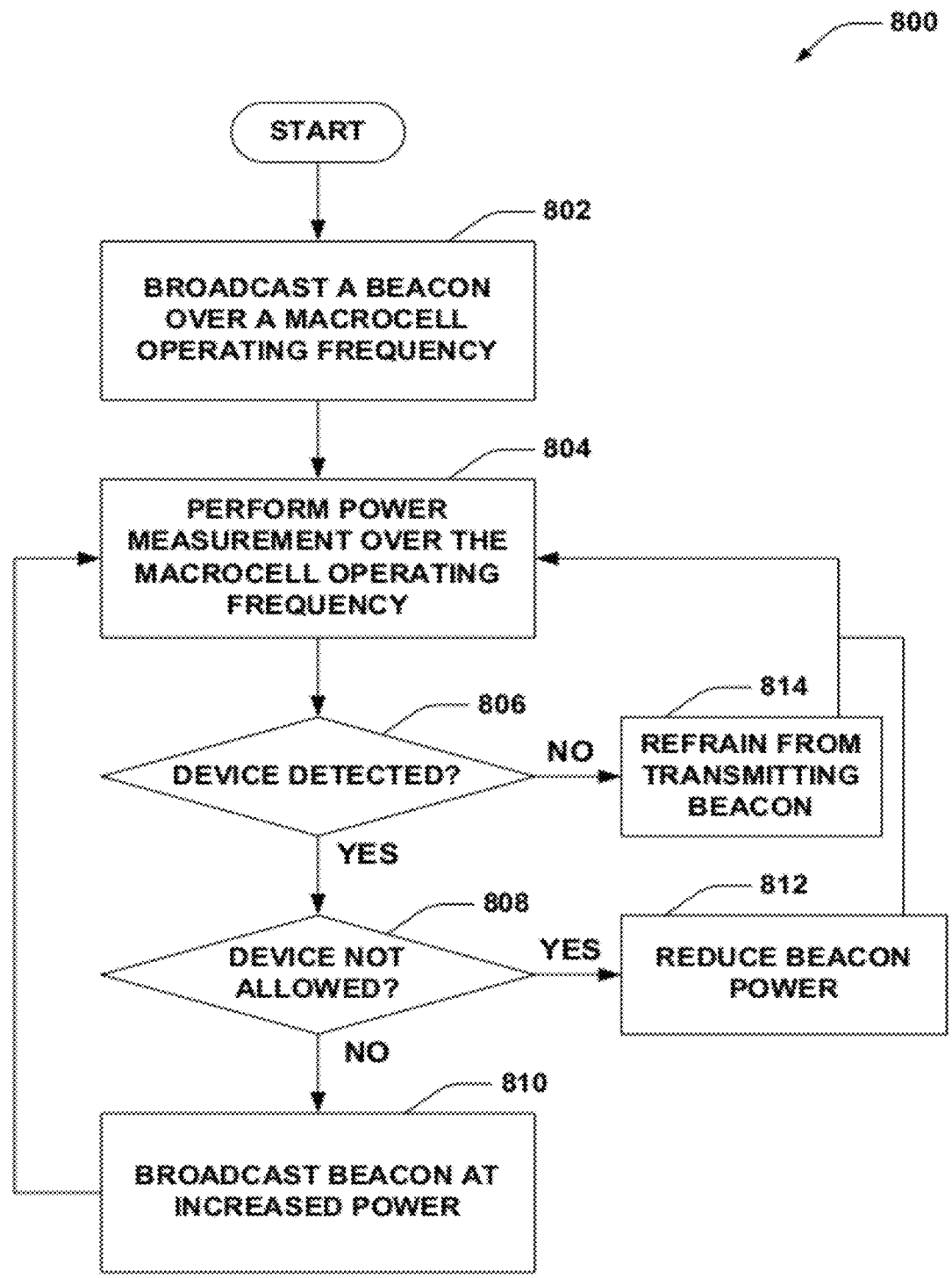
FIG. 8 is a flow chart of an aspect of an example methodology for determining whether to modify broadcasting a beacon.

Turning to FIG. 8, an example methodology 800 is displayed that facilitates determining whether to modify broadcasting a beacon. At 802, a beacon can be broadcast over a macrocell operating frequency. As described, the beacon can emulate downlink transmissions of a macrocell base station to facilitate active hand-in of one or more devices. At 804, a power measurement can be performed over the macrocell operating frequency. For example, this can be an RSSI or similar measurement. At 806, it can be determined whether a device is detected. For example, this can be inferred based in part on an increase in RSSI, as described above. If so, it can be determined whether the device is not allowed to communicate at 808. For example, this can include obtaining an indication of such for the device, attempting to authenticate the device, obtaining a whitelist of CSGs to which the device is allowed access and attempting to locate a CSG identifier in the whitelist, etc. If not (e.g., the device may be allowed to communicate), at 810, the beacon can be broadcasted at an increased power. As described, the beacon power can be increased based on a deterministic power level, stepped up until a hand-in is detected, and/or the like.

In any case, following broadcasting the beacon at the increased power, other power measurements can be performed at 804 to facilitate dynamically adjusting the beacon power. If the device is not allowed to communicate (e.g., in the CSG) at 808, beacon power can be reduced at 812. For example, the beacon power can be reduced as a function of the measured RSSI, a difference between the measured RSSI and a previous RSSI, etc. to mitigate interference to the device. In this example, additional power measurements can then be performed at 804 to facilitate dynamically adjusting the beacon power. If a device is not detected at 806, transmitting the beacon can be refrained from at 814. In this example, as well, power measurements can be performed at 804.

Figure 9:
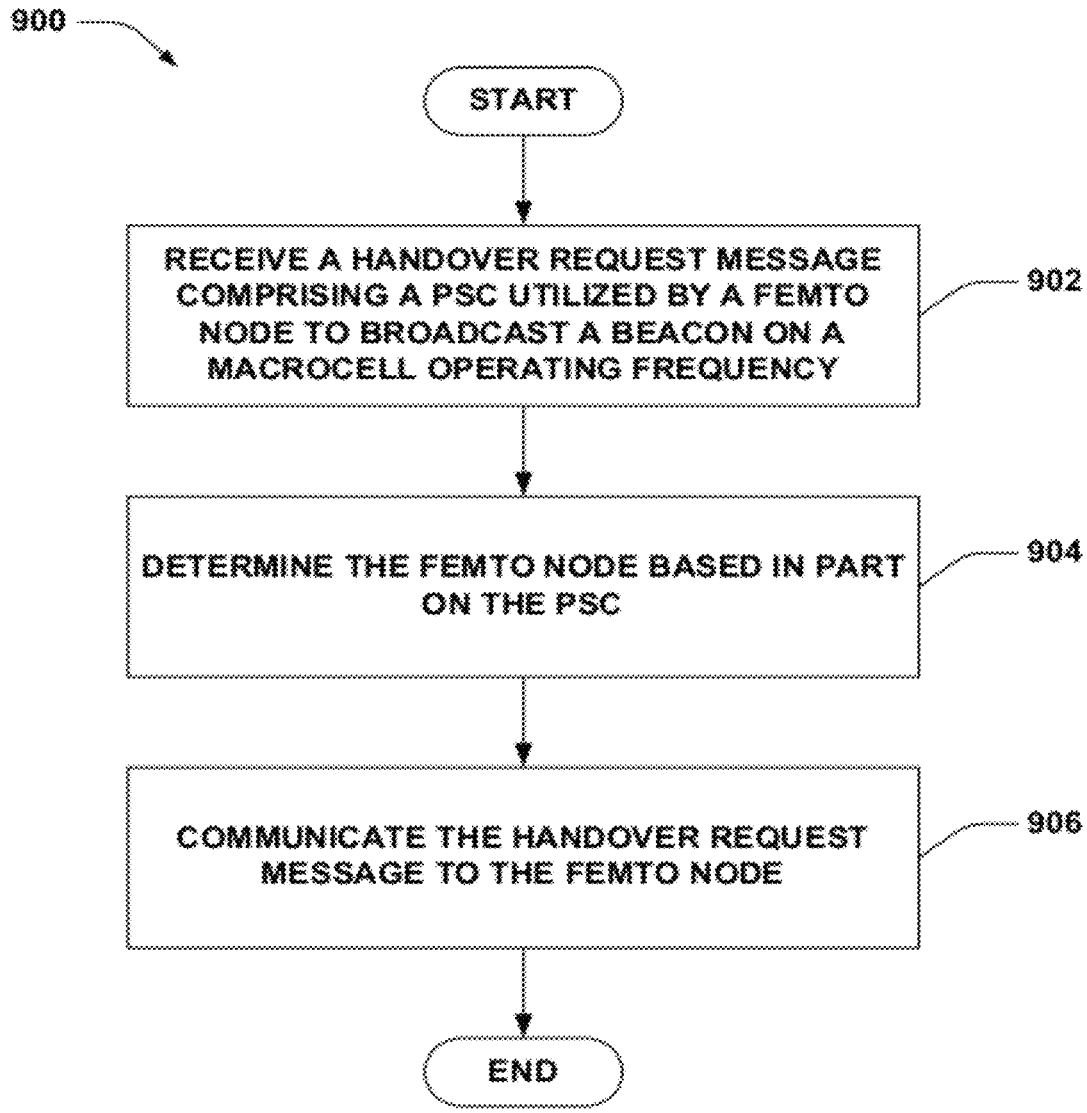
FIG. 9 is a flow chart of an aspect of an example methodology that communicates handover request messages to one or more femto nodes.

Referring to FIG. 9, an example methodology 900 for communicating a handover request message for performing inter-frequency hand-in of a device to a femto node is illustrated. At 902, a handover request message can be received comprising a PSC utilized by a femto node to broadcast a beacon on a macrocell operating frequency. For example, the PSC can be assigned to the femto node by a femto gateway or there can otherwise be a known association of the PSC to at least the femto node. At 904, the femto node can be determined based in part on the PSC. Thus, for example, additional received or measured parameters can be utilized to disambiguate the femto node, such as another PSC of a related pilot signal, an observed timing difference between the femto node and one or more macrocell base stations, uplink RSSI, a reported location of a device, femto node, etc. At 906, the handover request message can be communicated to the femto node. Thus, the femto node can prepare to receive hand-in of the device.

Figure 10:
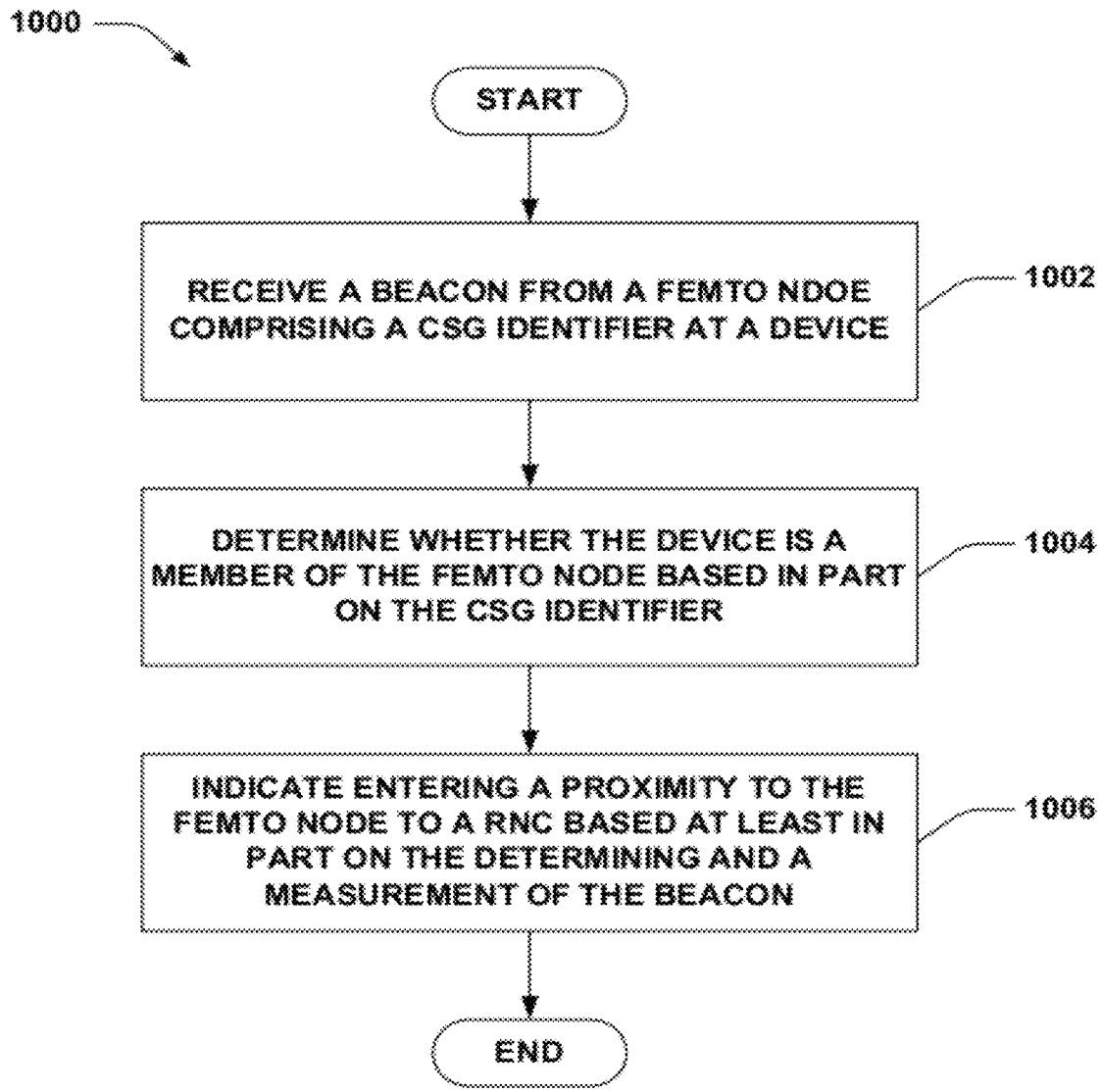
FIG. 10 is a flow chart of an aspect of an example methodology that indicates proximity to a femto node.

Turning to FIG. 10, an example methodology 1000 is depicted for indicating proximity to a femto node. At 1002, a beacon can be received from a femto node comprising a CSG identifier at a device. For example, the CSG identifier can be used to implement restricted association at the femto node, as described, to allow access to members of the CSG. At 1004, it can be determined whether the device is a member of the femto node based in part on the CSG identifier. For example, this can include comparing the CSG identifier to a whitelist of accessible CSG identifiers, determining that the femto node operates in hybrid mode, etc. At 1006, entering a proximity to the femto node can be indicated to a RNC based at least in part on the determining and a measurement of the beacon. For example, a measurement report can be transmitted to an RNC comprising a proximity indicator (e.g., system information with a proximity indicator information element) and the measurement of the beacon (e.g., an SNR thereof). Thus, one or more measurement configuration parameters can be received for receiving signals from the femto node. For example, the parameters can correspond to operating in a compressed mode. In addition, upon receiving a beacon without the CSG identifier or not receiving the beacon, for example, exit of the proximity to the femto node can be indicated.

Figure 11:
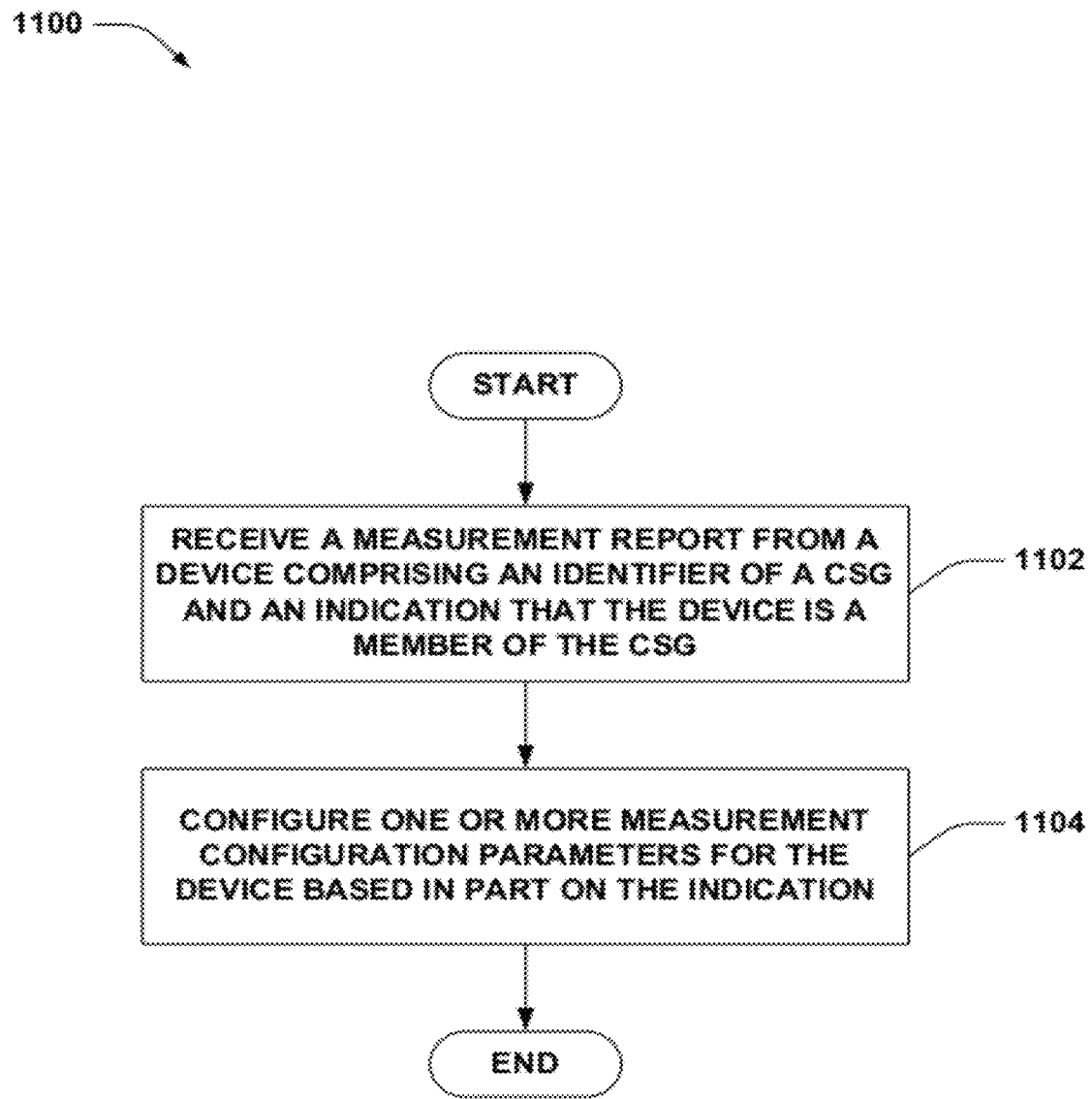
FIG. 11 is a flow chart of an aspect of an example methodology that configures measurement configuration parameters for a device based on a proximity to a femto node.

Referring to FIG. 11, an example methodology 1100 is illustrated for configuring measurement configuration parameters for a device. At 1102, a measurement report can be received from a device comprising an identifier of a CSG and an indication that the device is a member of the CSG. In one example, the identifier can be part of the measurement report. At 1104, one or more measurement configuration parameters can be configured for the device based on the indication. For example, the measurement configuration parameters can relate to operating in a compressed mode and can include time intervals over which the device can measure other base stations, for example. In addition, upon receiving a second measurement report from the device that does not include the CSG identifier, the measurement configuration parameters can be deconfigured.

It will be appreciated that, in accordance with one or more aspects described herein, inferences can be made regarding transmitting a beacon to facilitate inter-frequency active hand-in, determining a power for the beacon, determining whether to transmit the beacon in a given time period, determining a femto node related to a beacon, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
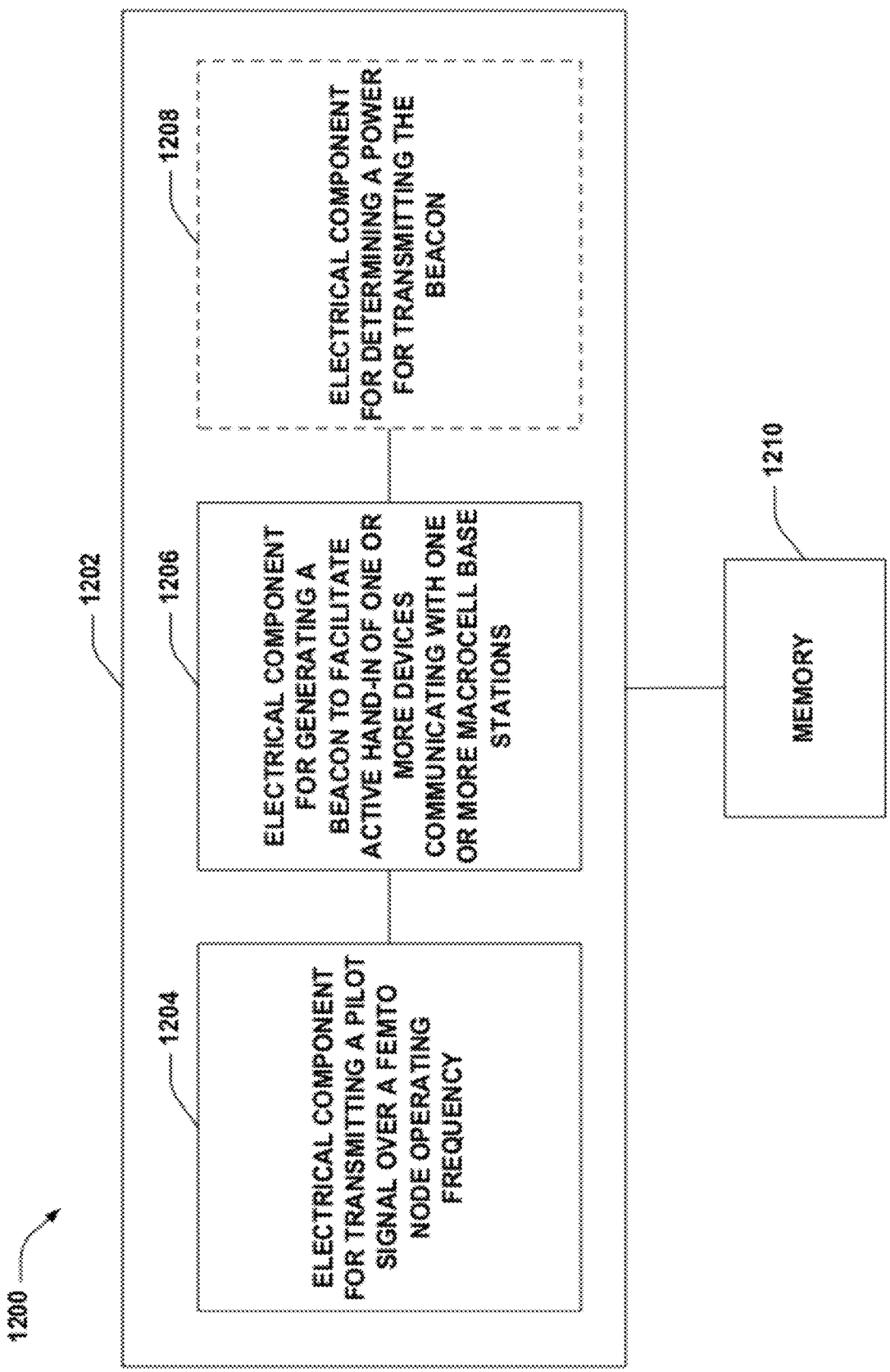
FIG. 12 is a block diagram of an example system that generates a beacon for transmitting for a femto node over a macrocell operating frequency.

With reference to FIG. 12, illustrated is a system 1200 for generating a beacon to cause active hand-in of one or more devices. For example, system 1200 can reside at least partially within a femto node. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for transmitting a pilot signal over a femto node operating frequency 1204. In one example, a first PSC assigned from a femto gateway or otherwise received or determined can be utilized in transmitting the pilot signal.

Further, logical grouping 1202 can comprise an electrical component for generating a beacon to facilitate active hand-in of one or more devices communicating with one or more macrocell base stations 1206. Electrical component 1204, for example, can transmit the beacon over a macrocell frequency, as described. In addition, logical grouping 1202 can optionally include an electrical component for determining a power for transmitting the beacon 1208. This can be based on RSSI or other measurements, as described. For example, electrical component 1204 can include a communications component 206, as described above. In addition, for example, electrical component 1206, in an aspect, can include beacon generating component 212, as described above. Moreover, electrical component 1208 can include a beacon power determining component 216, as described.

Additionally, system 1200 can include a memory 1210 that retains instructions for executing functions associated with the electrical components 1204, 1206, and 1208. While shown as being external to memory 1210, it is to be understood that one or more of the electrical components 1204, 1206, and 1208 can exist within memory 1210. In one example, electrical components 1204, 1206, and 1208 can comprise at least one processor, or each electrical component 1204, 1206, and 1208 can be a corresponding module of at least one processor. Moreover, in an additional or alternative example, electrical components 1204, 1206, and 1208 can be a computer program product comprising a computer readable medium, where each electrical component 1204, 1206, and 1208 can be corresponding code.

Figure 13:
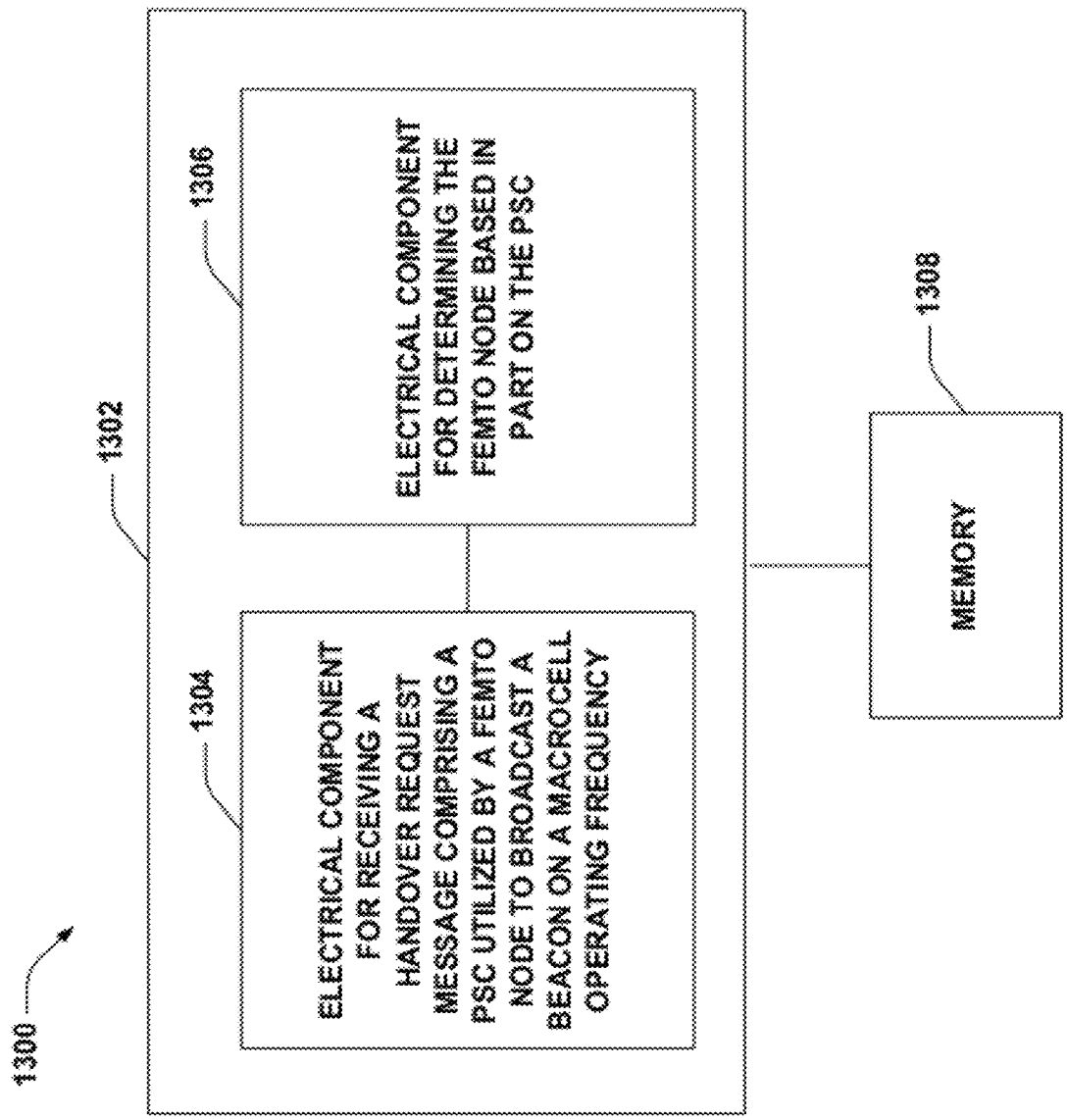
FIG. 13 is a block diagram of an example system that communicates handover request messages to one or more femto nodes.

With reference to FIG. 13, illustrated is a system 1300 for determining a femto node related to a reported measurement from a beacon thereof. For example, system 1300 can reside at least partially within a RNC, femto gateway, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving a handover request message comprising a PSC utilized by a femto node to broadcast a beacon on a macrocell operating frequency 1304. In one example, system 1300 can have assigned the PSC and/or can otherwise have an association of the PSC to the femto node (e.g., in conjunction with one or more other parameters, such as a PSC for a pilot signal, a location, etc.).

Further, logical grouping 1302 can comprise an electrical component for determining the femto node based in part on the PSC 1306. Moreover, for example, electrical component 1304 can transmit the handover request message to the determined femto node. For example, electrical component 1304 can include a communications component 406 or 506, as described above. In addition, for example, electrical component 1306, in an aspect, can include a femto node disambiguating component 414 or 516, as described above.

Additionally, system 1300 can include a memory 1308 that retains instructions for executing functions associated with the electrical components 1304 and 1306. While shown as being external to memory 1308, it is to be understood that one or more of the electrical components 1304 and 1306 can exist within memory 1308. In one example, electrical components 1304 and 1306 can comprise at least one processor, or each electrical component 1304 and 1306 can be a corresponding module of at least one processor. Moreover, in an additional or alternative example, electrical components 1304 and 1306 can be a computer program product comprising a computer readable medium, where each electrical component 1304 and 1306 can be corresponding code.

Figure 14:
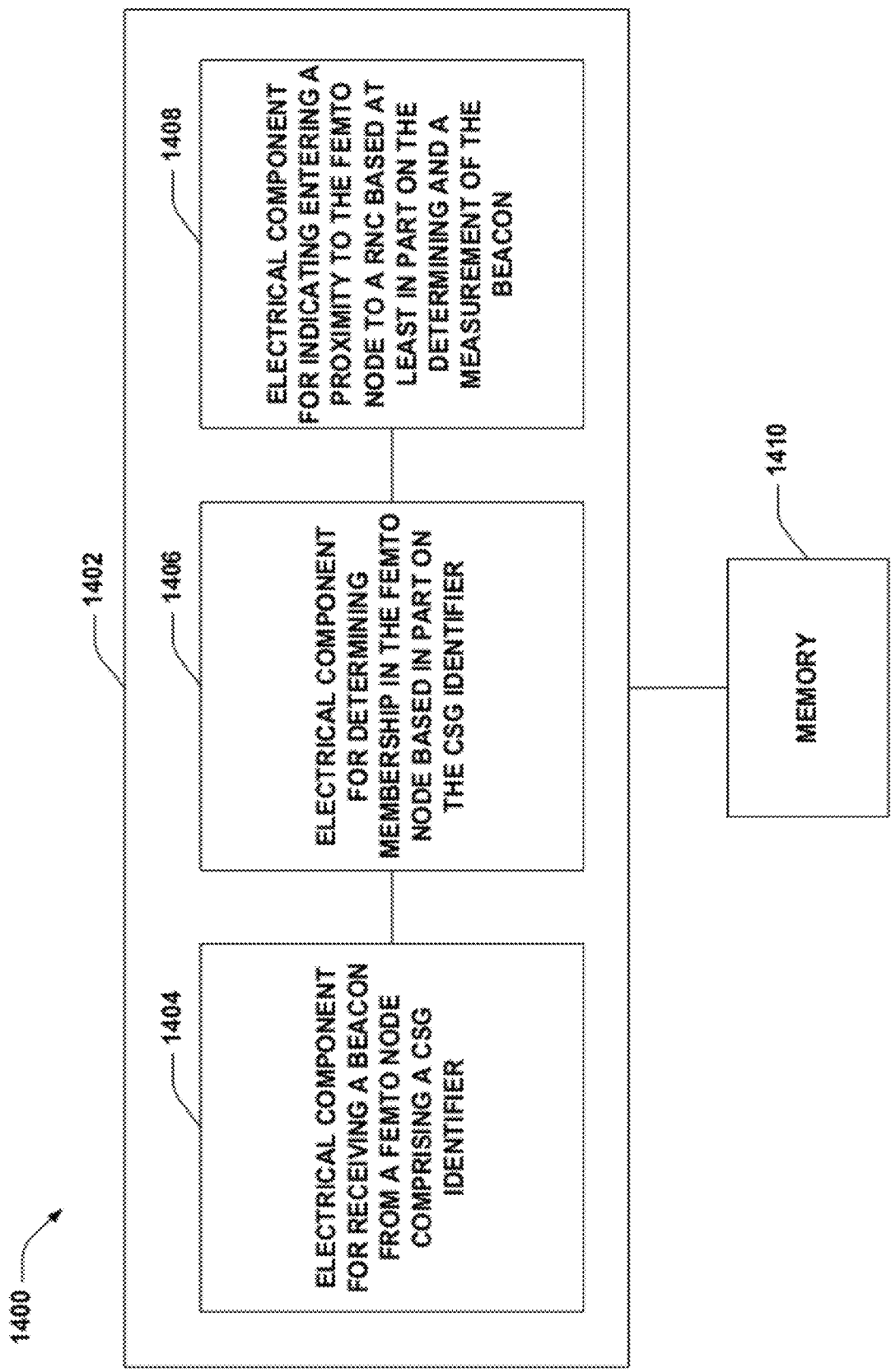
FIG. 14 is a block diagram of an example system that indicates proximity to a femto node.

With reference to FIG. 14, illustrated is a system 1400 for indicating proximity to a femto node. For example, system 1400 can reside at least partially within a device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving a beacon from a femto node comprising a CSG identifier 1404. In one example, the beacon can be received over a macrocell frequency. Logical grouping 1402 can further include an electrical component for determining membership in the femto node based in part on the CSG identifier 1406. For example, this can include determining whether system 1400 is a member of the femto node (e.g., whether the CSG is in a whitelist of system 1400, whether the femto node operates in hybrid access mode, etc.).

Further, logical grouping 1402 can comprise an electrical component for indicating entering a proximity to the femto node to a RNC based at least in part on the determining and a measurement of the beacon 1408. In this regard, the macrocell can schedule one or more measurement configuration parameters (e.g. compressed mode parameters) to the device to allow measuring the femto node during specified time intervals. In addition, electrical component 1404 can measure the beacon in a subsequent time period, and electrical component 1406 can detect that system 1400 is leaving proximity of the femto node (e.g., based on a diminishing signal quality of the beacon), and electrical component 1408 can similarly notify the macrocell base station. For example, electrical component 1404 can include a communications component 306, and electrical component 1406 can include a proximity determining component 318, as described above. In addition, for example, electrical component 1408, in an aspect, can include a parameter communicating component 316, as described above.

Additionally, system 1400 can include a memory 1410 that retains instructions for executing functions associated with the electrical components 1404, 1406, and 1408. While shown as being external to memory 1410, it is to be understood that one or more of the electrical components 1404, 1406, and 1408 can exist within memory 1410. In one example, electrical components 1404, 1406, and 1408 can comprise at least one processor, or each electrical component 1404, 1406, and 1408 can be a corresponding module of at least one processor. Moreover, in an additional or alternative example, electrical components 1404, 1406, and 1408 can be a computer program product comprising a computer readable medium, where each electrical component 1404, 1406, and 1408 can be corresponding code.

Figure 15:
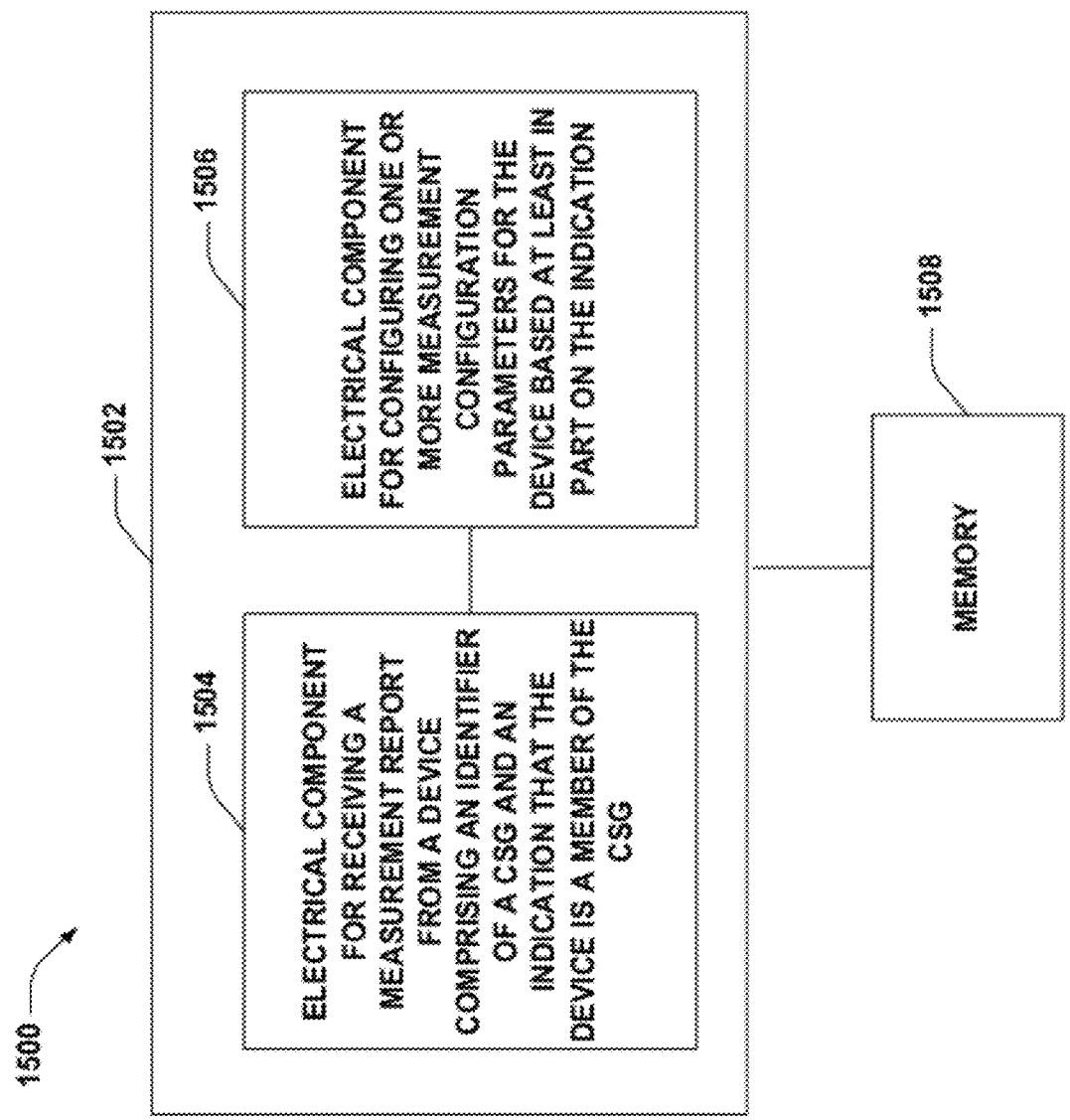
FIG. 15 is a block diagram of an example system that configures measurement configuration parameters for a device based on a proximity to a femto node.

With reference to FIG. 15, illustrated is a system 1500 for configuring a device with measurement configuration parameters. For example, system 1500 can reside at least partially within a RNC. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for receiving a measurement report from a device comprising an identifier of a CSG and an indication that the device is a member of the CSG 1504.

Further, logical grouping 1502 can comprise an electrical component for configuring one or more measurement configuration parameters for the device based at least in part on the indication 1506. For example, the measurement configuration parameters can correspond to compressed mode parameters, such as one or more measurement gaps during which other access points can be measured. In addition, electrical component 1504 can obtain an indication that the device is leaving proximity of the femto node, or otherwise determine such based on a subsequent measurement report from the device, and electrical component 1506 can accordingly deconfigure compressed mode parameters to conserve resources at the device. For example, electrical component 1504 can include a proximity receiving component 420, as described above. In addition, for example, electrical component 1506, in an aspect, can include a hand-in component 416, as described above.

Additionally, system 1500 can include a memory 1508 that retains instructions for executing functions associated with the electrical components 1504 and 1506. While shown as being external to memory 1508, it is to be understood that one or more of the electrical components 1504 and 1506 can exist within memory 1508. In one example, electrical components 1504 and 1506 can comprise at least one processor, or each electrical component 1504 and 1506 can be a corresponding module of at least one processor. Moreover, in an additional or alternative example, electrical components 1504 and 1506 can be a computer program product comprising a computer readable medium, where each electrical component 1504 and 1506 can be corresponding code.

Figure 16:
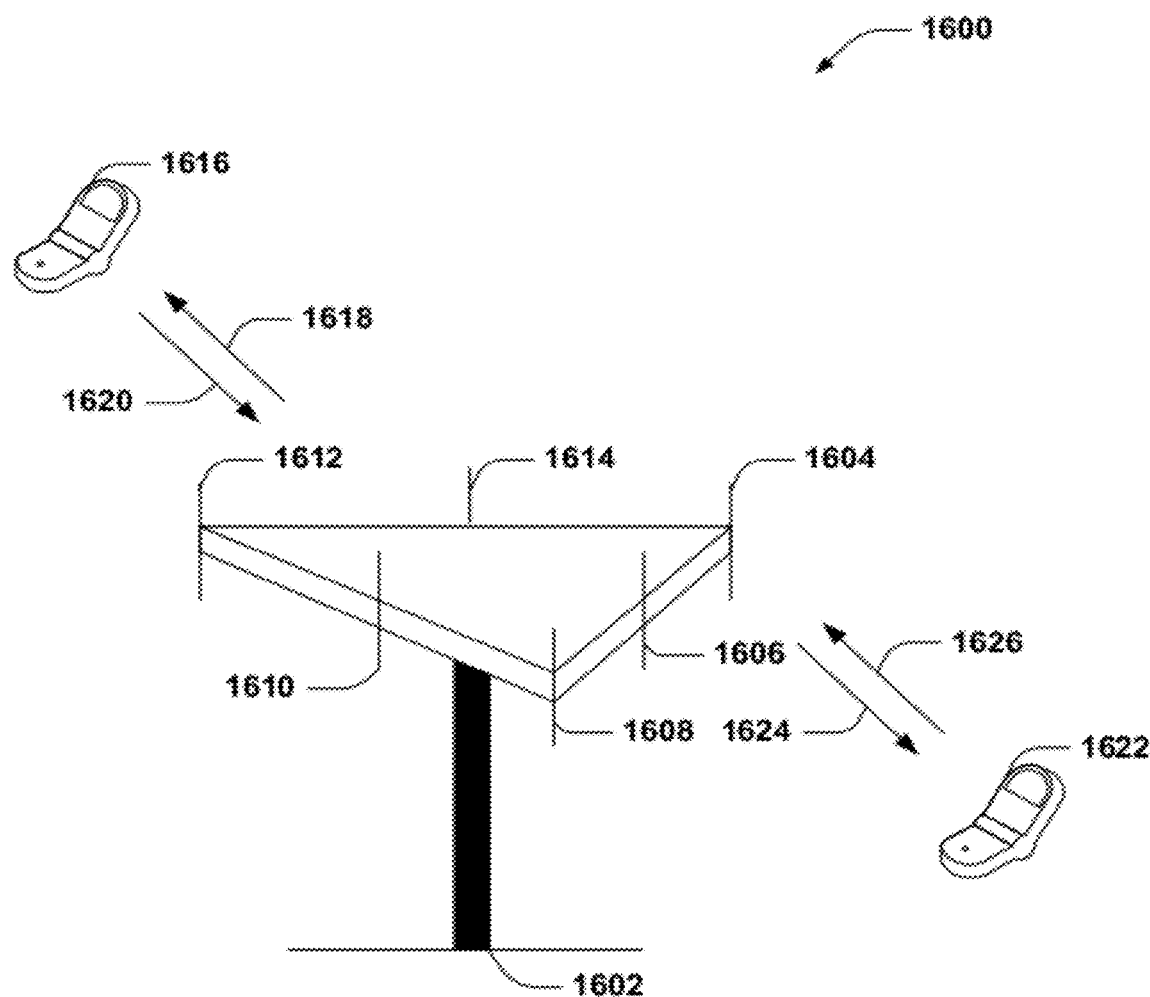
FIG. 16 is a block diagram of an example wireless communication system in accordance with various aspects set forth herein.

Referring now to FIG. 16, a wireless communication system 1600 is illustrated in accordance with various embodiments presented herein. System 1600 comprises a base station 1602 that can include multiple antenna groups. For example, one antenna group can include antennas 1604 and 1606, another group can comprise antennas 1608 and 1610, and an additional group can include antennas 1612 and 1614. Two antennas are illustrated for each antenna group; however, more or fewer antennas can be utilized for each group. Base station 1602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1602 can communicate with one or more mobile devices such as mobile device 1616 and mobile device 1622; however, it is to be appreciated that base station 1602 can communicate with substantially any number of mobile devices similar to mobile devices 1616 and 1622. Mobile devices 1616 and 1622 can be, for example, cellular phones, smart phones, laptops, handheld communication devices, handheld computing devices, satellite radios, global positioning systems, PDAs, and/or any other suitable device for communicating over wireless communication system 1600. As depicted, mobile device 1616 is in communication with antennas 1612 and 1614, where antennas 1612 and 1614 transmit information to mobile device 1616 over a forward link 1618 and receive information from mobile device 1616 over a reverse link 1620. Moreover, mobile device 1622 is in communication with antennas 1604 and 1606, where antennas 1604 and 1606 transmit information to mobile device 1622 over a forward link 1624 and receive information from mobile device 1622 over a reverse link 1626. In a frequency division duplex (FDD) system, forward link 1618 can utilize a different frequency band than that used by reverse link 1620, and forward link 1624 can employ a different frequency band than that employed by reverse link 1626, for example. Further, in a time division duplex (TDD) system, forward link 1618 and reverse link 1620 can utilize a common frequency band and forward link 1624 and reverse link 1626 can utilize a common frequency band.

Each group of antennas and/or the area in which they are designated to communicate can be referred to as a sector of base station 1602. For example, antenna groups can be designed to communicate to mobile devices in a sector of the areas covered by base station 1602. In communication over forward links 1618 and 1624, the transmitting antennas of base station 1602 can utilize beamforming to improve signal-to-noise ratio of forward links 1618 and 1624 for mobile devices 1616 and 1622. Also, while base station 1602 utilizes beamforming to transmit to mobile devices 1616 and 1622 scattered randomly through an associated coverage, mobile devices in neighboring cells can be subject to less interference as compared to a base station transmitting through a single antenna to all its mobile devices. Moreover, mobile devices 1616 and 1622 can communicate directly with one another using a peer-to-peer or ad hoc technology as depicted. According to an example, system 1600 can be a multiple-input multiple-output (MIMO) communication system. In addition, for example, base station 1602 can receive measurement reports from device 1616 and/or 1622 related to a beacon received from a femto node (not shown) and can disambiguate the femto node for initiating hand-in thereto.

Figure 17:
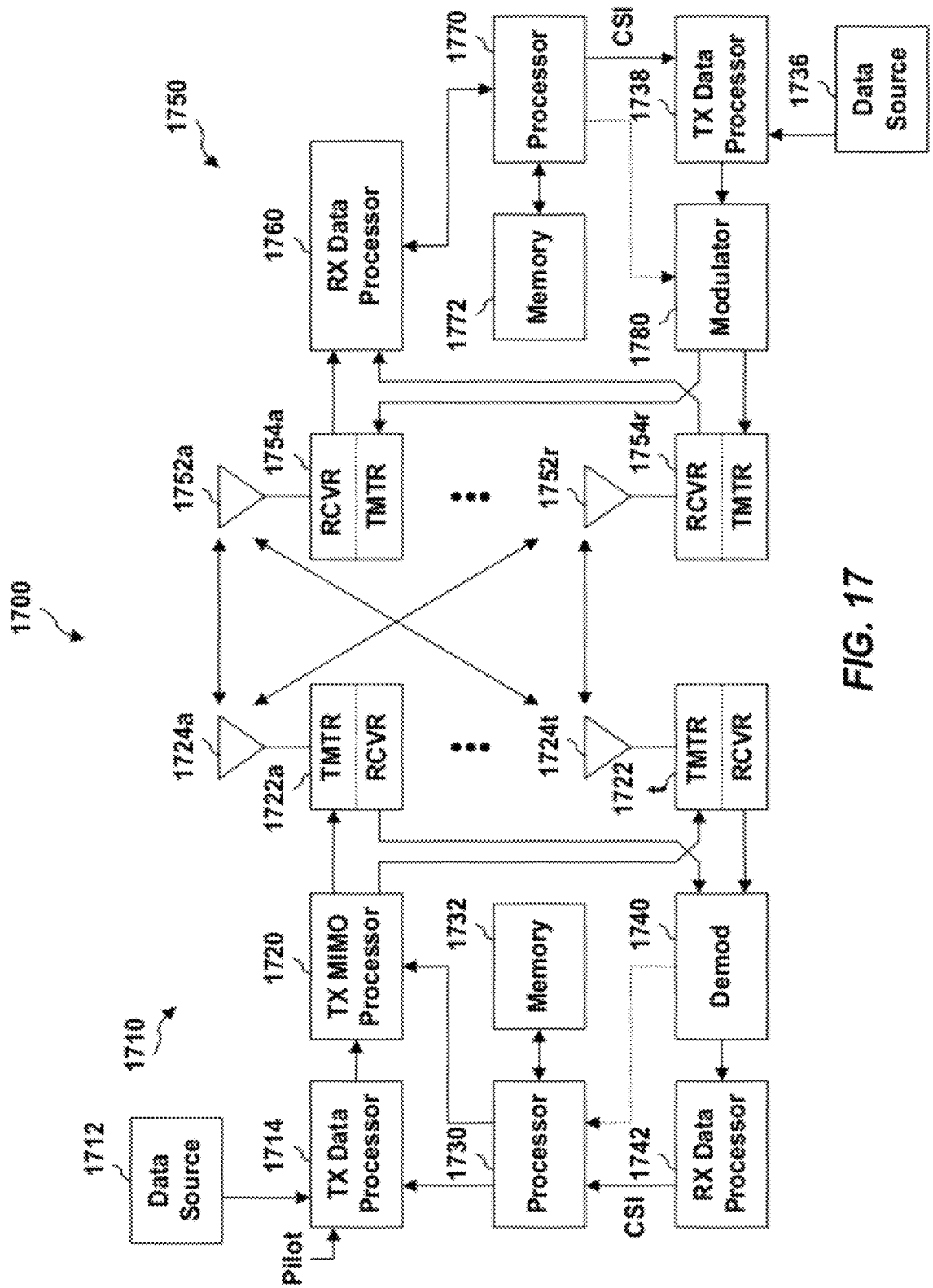
FIG. 17 is an illustration of an example wireless network environment that can be employed in conjunction with the various systems and methods described herein.

FIG. 17 shows an example wireless communication system 1700. The wireless communication system 1700 depicts one base station 1710 and one mobile device 1750 for sake of brevity. However, it is to be appreciated that system 1700 can include more than one base station and/or more than one mobile device, wherein additional base stations and/or mobile devices can be substantially similar or different from example base station 1710 and mobile device 1750 described below. In addition, it is to be appreciated that base station 1710 and/or mobile device 1750 can employ the systems (FIGS. 1-6 and 12-16) and/or methods (FIGS. 7-11) described herein to facilitate wireless communication there between. For example, components or functions of the systems and/or methods described herein can be part of a memory 1732 and/or 1772 or processors 1730 and/or 1770 described below, and/or can be executed by processors 1730 and/or 1770 to perform the disclosed functions.

At base station 1710, traffic data for a number of data streams is provided from a data source 1712 to a transmit (TX) data processor 1714. According to an example, each data stream can be transmitted over a respective antenna. TX data processor 1714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1730.

The modulation symbols for the data streams can be provided to a TX MIMO processor 1720, which can further process the modulation symbols (e.g., for OFDM). TX MIMO processor 1720 then provides $N_T$ modulation symbol streams to $N_T$ transmitters (TMTR) 1722a through 1722t. In various embodiments, TX MIMO processor 1720 applies beamforming weights to the symbols of the data streams and to the antenna from which the symbol is being transmitted.

Each transmitter 1722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1722a through 1722t are transmitted from $N_T$ antennas 1724a through 1724t, respectively.

At mobile device 1750, the transmitted modulated signals are received by $N_R$ antennas 1752a through 1752r and the received signal from each antenna 1752 is provided to a respective receiver (RCVR) 1754a through 1754r. Each receiver 1754 conditions (e.g., filters, amplifies, and downconverts) a respective signal, digitizes the conditioned signal to provide samples, and further processes the samples to provide a corresponding "received" symbol stream.

An RX data processor 1760 can receive and process the $N_R$ received symbol streams from $N_R$ receivers 1754 based on a particular receiver processing technique to provide $N_T$ "detected" symbol streams. RX data processor 1760 can demodulate, deinterleave, and decode each detected symbol stream to recover the traffic data for the data stream. The processing by RX data processor 1760 is complementary to that performed by TX MIMO processor 1720 and TX data processor 1714 at base station 1710.

The reverse link message can comprise various types of information regarding the communication link and/or the received data stream. The reverse link message can be processed by a TX data processor 1738, which also receives traffic data for a number of data streams from a data source 1736, modulated by a modulator 1780, conditioned by transmitters 1754a through 1754r, and transmitted back to base station 1710.

At base station 1710, the modulated signals from mobile device 1750 are received by antennas 1724, conditioned by receivers 1722, demodulated by a demodulator 1740, and processed by a RX data processor 1742 to extract the reverse link message transmitted by mobile device 1750. Further, processor 1730 can process the extracted message to determine which precoding matrix to use for determining the beamforming weights.

Processors 1730 and 1770 can direct (e.g., control, coordinate, manage, etc.) operation at base station 1710 and mobile device 1750, respectively. Respective processors 1730 and 1770 can be associated with memory 1732 and 1772 that store program codes and data. Processors 1730 and 1770 can report parameters related to a received beacon, determine a femto node related to the beacon, initiate hand-in to the femto node, etc.

Figure 18:
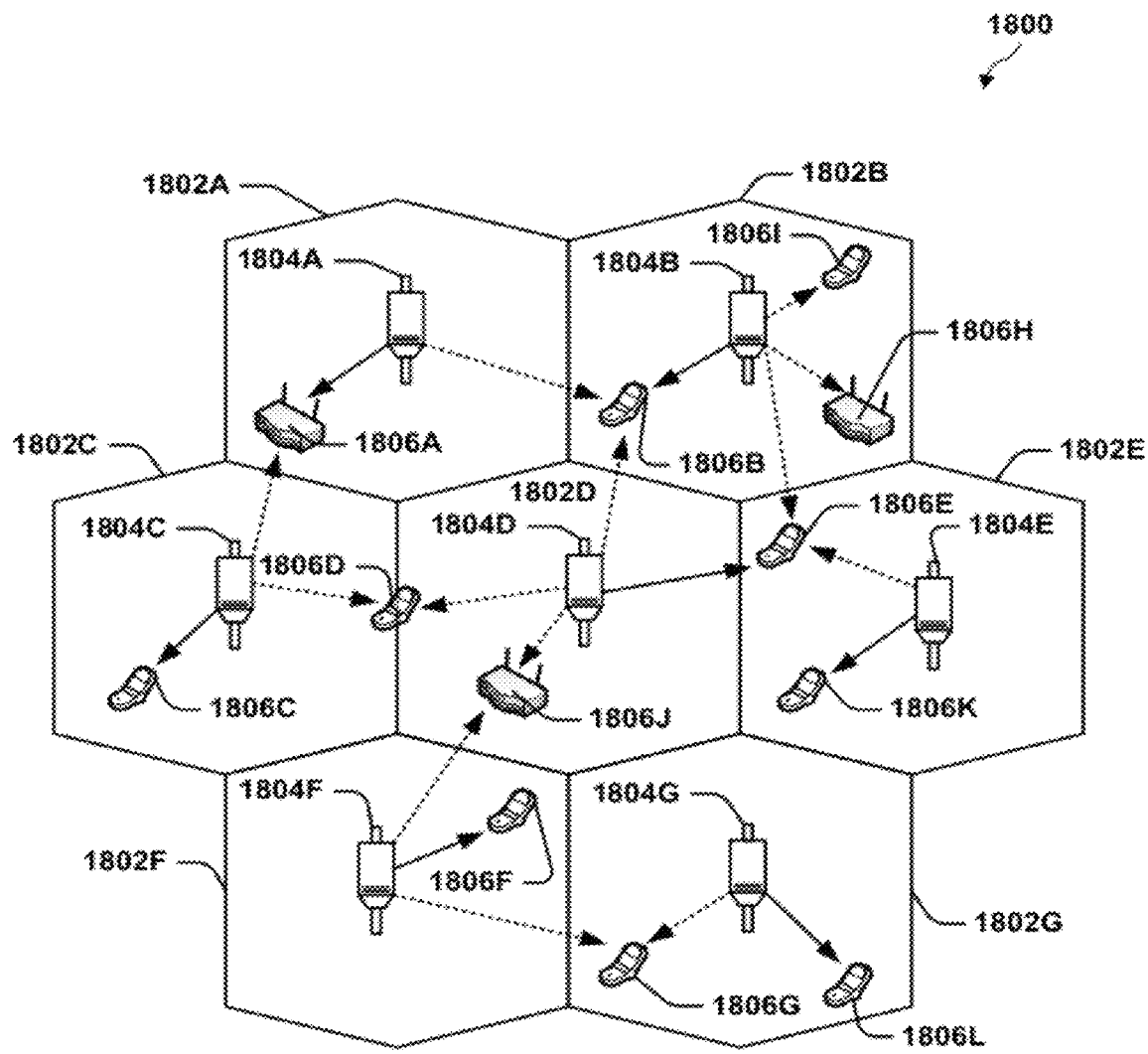
FIG. 18 illustrates an example wireless communication system, configured to support a number of devices, in which the aspects herein can be implemented.

FIG. 18 illustrates a wireless communication system 1800, configured to support a number of users, in which the teachings herein may be implemented. The system 1800 provides communication for multiple cells 1802, such as, for example, macro cells 1802A-1802G, with each cell being serviced by a corresponding access node 1804 (e.g., access nodes 1804A-1804G). As shown in FIG. 18, access terminals 1806 (e.g., access terminals 1806A-1806L) can be dispersed at various locations throughout the system over time. Each access terminal 1806 can communicate with one or more access nodes 1804 on a forward link (FL) and/or a reverse link (RL) at a given moment, depending upon whether the access terminal 1806 is active and whether it is in soft handoff, for example. The wireless communication system 1800 can provide service over a large geographic region.

Figure 19:
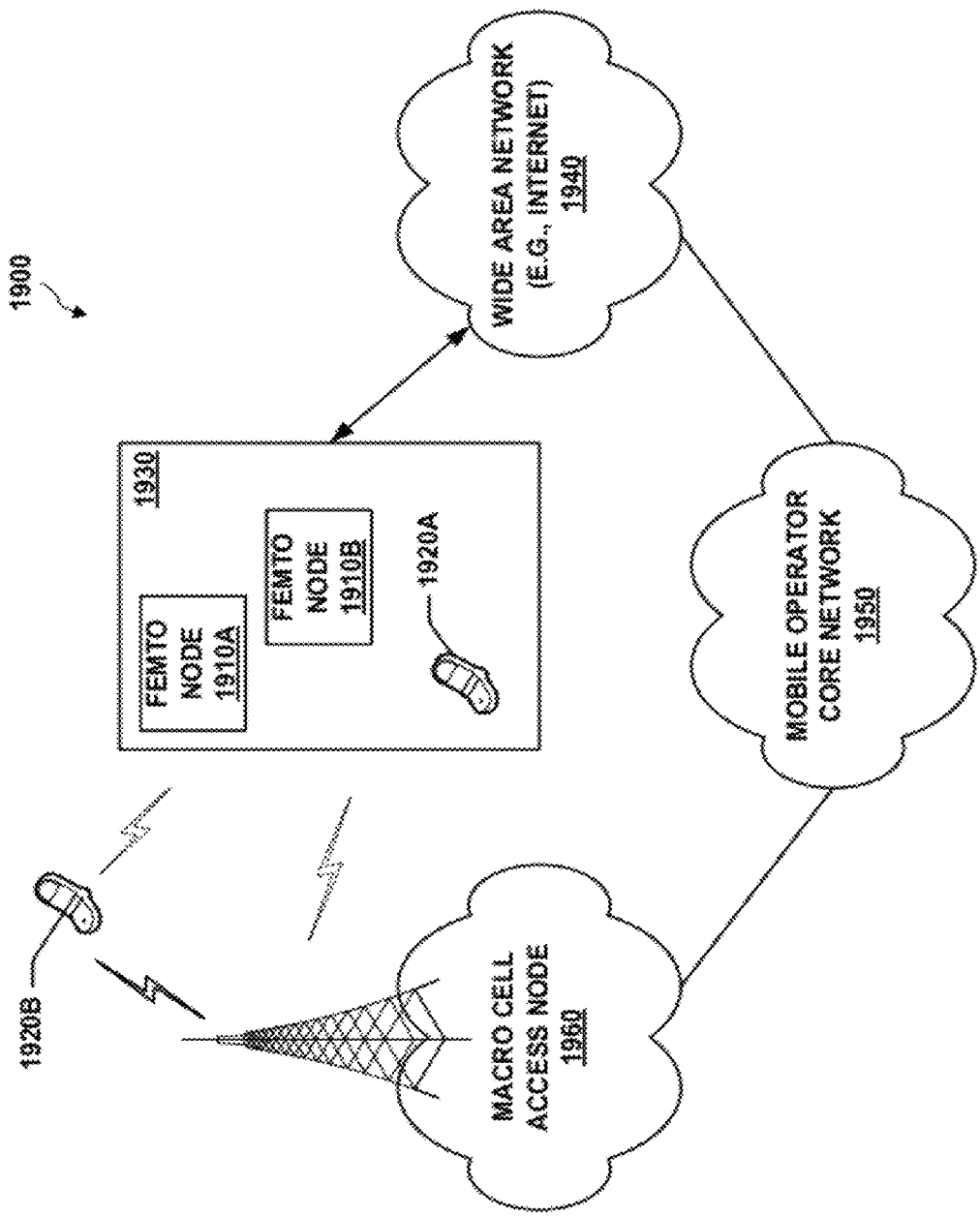
FIG. 19 is an illustration of an exemplary communication system to enable deployment of femtocells within a network environment.

FIG. 19 illustrates an exemplary communication system 1900 where one or more femto nodes are deployed within a network environment. Specifically, the system 1900 includes multiple femto nodes 1910A and 1910B (e.g., femtocell nodes or H(e)NB) installed in a relatively small scale network environment (e.g., in one or more user residences 1930). Each femto node 1910 can be coupled to a wide area network 1940 (e.g., the Internet) and a mobile operator core network 1950 via a digital subscriber line (DSL) router, a cable modem, a wireless link, or other connectivity means (not shown). As will be discussed below, each femto node 1910 can be configured to serve associated access terminals 1920 (e.g., access terminal 1920A) and, optionally, alien access terminals 1920 (e.g., access terminal 1920B). In other words, access to femto nodes 1910 can be restricted such that a given access terminal 1920 can be served by a set of designated (e.g., home) femto node(s) 1910 but may not be served by any non-designated femto nodes 1910 (e.g., a neighbor's femto node).

Figure 20:
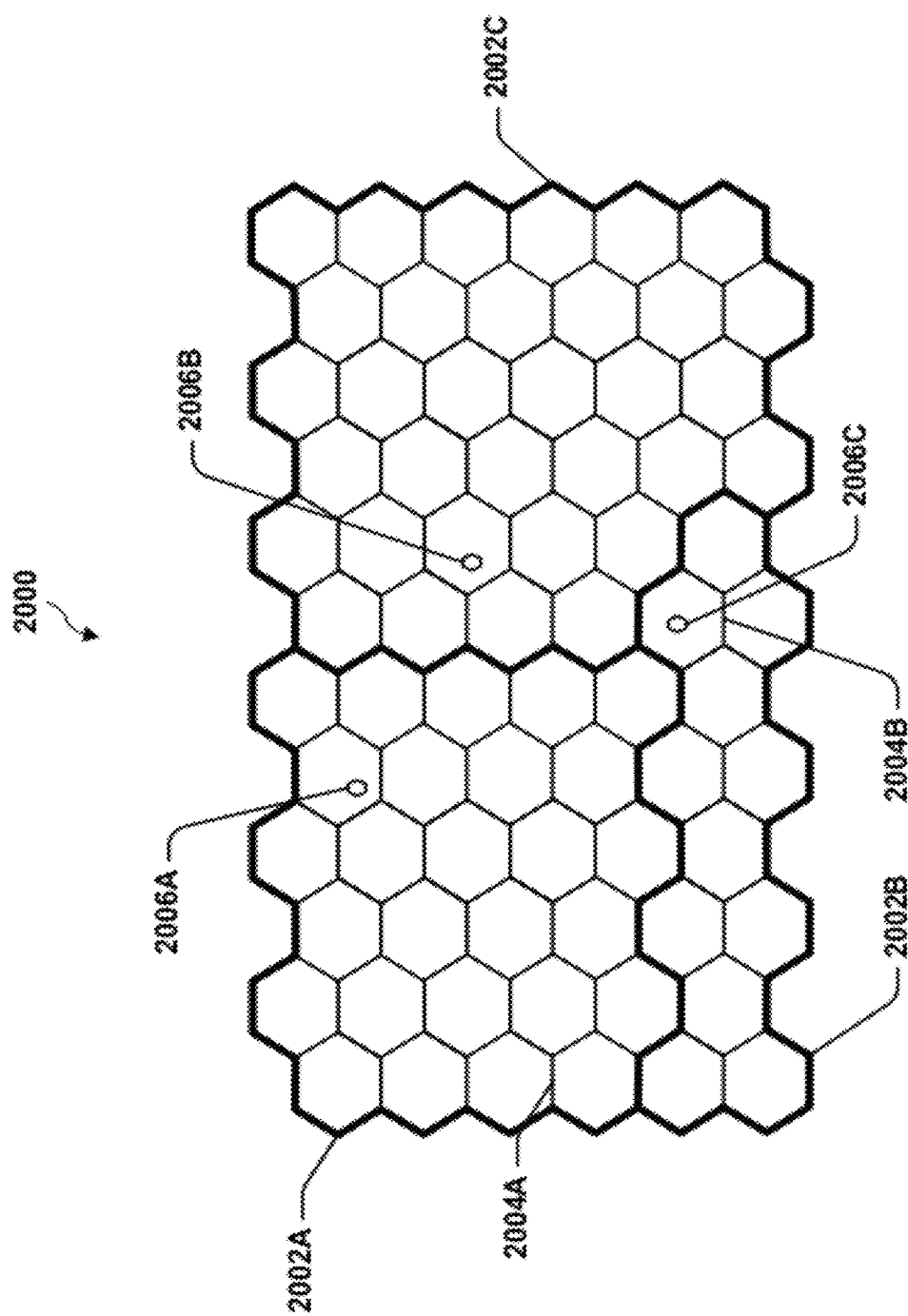
FIG. 20 illustrates an example of a coverage map having several defined tracking areas.

FIG. 20 illustrates an example of a coverage map 2000 where several tracking areas 2002 (or routing areas or location areas) are defined, each of which includes several macro coverage areas 2004. Here, areas of coverage associated with tracking areas 2002A, 2002B, and 2002C are delineated by the wide lines and the macro coverage areas 2004 are represented by the hexagons. The tracking areas 2002 also include femto coverage areas 2006. In this example, each of the femto coverage areas 2006 (e.g., femto coverage area 2006C) is depicted within a macro coverage area 2004 (e.g., macro coverage area 2004B). It should be appreciated, however, that a femto coverage area 2006 may not lie entirely within a macro coverage area 2004. In practice, a large number of femto coverage areas 2006 can be defined with a given tracking area 2002 or macro coverage area 2004. Also, one or more pico coverage areas (not shown) can be defined within a given tracking area 2002 or macro coverage area 2004.

Referring again to FIG. 19, the owner of a femto node 1910 can subscribe to mobile service, such as, for example, 3G mobile service, offered through the mobile operator core network 1950. In addition, an access terminal 1920 can be capable of operating both in macro environments and in smaller scale (e.g., residential) network environments. Thus, for example, depending on the current location of the access terminal 1920, the access terminal 1920 can be served by an access node 1960 or by any one of a set of femto nodes 1910 (e.g., the femto nodes 1910A and 1910B that reside within a corresponding user residence 1930). For example, when a subscriber is outside his home, he is served by a standard macro cell access node (e.g., node 1960) and when the subscriber is at home, he is served by a femto node (e.g., node 1910A). Here, it should be appreciated that a femto node 1910 can be backward compatible with existing access terminals 1920.

A femto node 1910 can be deployed on a single frequency or, in the alternative, on multiple frequencies. Depending on the particular configuration, the single frequency or one or more of the multiple frequencies can overlap with one or more frequencies used by a macro cell access node (e.g., node 1960). In some aspects, an access terminal 1920 can be configured to connect to a preferred femto node (e.g., the home femto node of the access terminal 1920) whenever such connectivity is possible. For example, whenever the access terminal 1920 is within the user's residence 1930, it can communicate with the home femto node 1910.

In some aspects, if the access terminal 1920 operates within the mobile operator core network 1950 but is not residing on its most preferred network (e.g., as defined in a preferred roaming list), the access terminal 1920 can continue to search for the most preferred network (e.g., femto node 1910) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1920 can limit the search for specific band and channel. For example, the search for the most preferred system can be repeated periodically. Upon discovery of a preferred femto node, such as femto node 1910, the access terminal 1920 selects the femto node 1910 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1910 that reside within the corresponding user residence 1930). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for communicating a beacon for active hand-in, comprising:
   transmitting a pilot signal over a femto node operating frequency;
   generating a beacon to facilitate active hand-in of one or more devices communicating with one or more macrocell base stations;
   determining: a first received signal strength indicator (RSSI) over a first macrocell operating frequency of the one or more macrocell base stations, a second RSSI over a second macrocell operating frequency of the one or more macrocell base stations, and a power for transmitting the beacon based at least in part on a relationship between the first RSSI and the second RSSI; and
   broadcasting the beacon over the first or the second macrocell operating frequency of the one or more macrocell base stations different from the femto node operating frequency in accordance with the power.

2. The method of claim 1, further comprising receiving one or more messages from the one or more macrocell base stations related to the active hand-in for the one or more devices based at least in part on the beacon.

3. The method of claim 2, further comprising transmitting a handover command for performing the active hand-in for the one or more devices.

4. The method of claim 3, further comprising determining to transmit the handover command based at least in part on comparing a received timing measurement or a received offset reported for a target femto node by the one or more devices to a timing measurement or an offset.

5. The method of claim 3, further comprising:
comparing the first or the second RSSI to a threshold to determine a presence of the one or more devices; and
determining to transmit the handover command where the first or the second RSSI is at least at the threshold.

6. The method of claim 1, wherein the broadcasting the beacon comprises broadcasting a pilot channel, a synchronization channel, or a common control channel for system information over the first or the second macrocell operating frequency.

7. The method of claim 1, wherein the beacon comprises an identity of a femto node.

8. The method of claim 7, wherein the identity of the femto node corresponds to a closed subscriber group (CSG) identity, a cell identity, or a primary scrambling code (PSC).

9. The method of claim 8, further comprising receiving the PSC from a femto gateway.

10. The method of claim 7, wherein the identity of the femto node corresponds to a chip-level timing, a frame timing, or another observed timing with respect to the one or more macrocell base stations.

11. The method of claim 1, wherein the determining the power for transmitting the beacon is based at least in part on a maximum transmit power for the beacon.

12. The method of claim 11, further comprising determining the maximum transmit power for the beacon based at least in part on determining a signal strength of the one or more macrocell base stations, or a desired signal strength for the beacon at a desired distance or desired pathloss.

13. The method of claim 1, further comprising determining to broadcast the beacon based at least in part on determining the first or the second RSSI or a change in the first or the second RSSI over the first or the second macrocell operating frequency.

14. The method of claim 13, further comprising determining to cease broadcast of the beacon based at least in part on determining another RSSI or another change in the another RSSI over another macrocell operating frequency.

15. The method of claim 1, further comprising broadcasting another beacon on another macrocell operating frequency different from the first or the second macrocell operating frequency and the femto node operating frequency.

16. The method of claim 15, wherein the broadcasting the another beacon comprises hopping frequencies over a period of time for transmitting the another beacon.

17. A method for communicating a beacon for active hand-in, comprising:
transmitting a pilot signal over a femto node operating frequency;
generating a beacon to facilitate active hand-in of one or more devices communicating with one or more macrocell base stations;
determining a received signal strength indicator (RSSI) over a macrocell operating frequency of the one or more macrocell base stations;
determining a power for transmitting the beacon based at least in part on the RSSI, comprising setting the power based at least in part on determining that the RSSI is over a threshold level; and
broadcasting the beacon over the macrocell operating frequency of the one or more macrocell base stations different from the femto node operating frequency.

18. A method for communicating a beacon for active hand-in, comprising:
transmitting a pilot signal over a femto node operating frequency;
generating a beacon to facilitate active hand-in of one or more devices communicating with one or more macrocell base stations;
determining a received signal strength indicator (RSSI) over a macrocell operating frequency of the one or more macrocell base stations;
determining a power for transmitting the beacon based at least in part on the RSSI, comprising determining that no devices attempt connection within a threshold time after detecting an increase in the RSSI; and
broadcasting the beacon over the macrocell operating frequency of the one or more macrocell base stations different from the femto node operating frequency.

19. A method for communicating a beacon for active hand-in, comprising:
transmitting a pilot signal over a femto node operating frequency;
generating a beacon to facilitate active hand-in of one or more devices communicating with one or more macrocell base stations;
determining a received signal strength indicator (RSSI) over a macrocell operating frequency of the one or more macrocell base stations;
determining a power for transmitting the beacon based at least in part on the RSSI and a type of signal received over the macrocell operating frequency; and
broadcasting the beacon over the macrocell operating frequency of the one or more macrocell base stations different from the femto node operating frequency.

20. An apparatus for communicating a beacon for active hand-in, comprising:
at least one processor configured to:
transmit a pilot signal over a femto node operating frequency;
generate a beacon to facilitate active hand-in of one or more devices communicating with one or more macrocell base stations;
determine: a first received signal strength indicator (RSSI) over a first macrocell operating frequency of the one or more macrocell base stations, a second RSSI over a second macrocell operating frequency of the one or more macrocell base stations, and a power for transmitting the beacon based at least in part on a relationship between the first RSSI and the second RSSI; and
broadcast the beacon over the first or the second macrocell operating frequency of the one or more macrocell base stations different from the femto node operating frequency in accordance with the power; and
a memory coupled to the at least one processor.

21. The apparatus of claim 20, wherein the at least one processor is further configured to receive one or more messages from the one or more macrocell base stations related to the active hand-in for the one or more devices based at least in part on the beacon.

22. The apparatus of claim 20, wherein the at least one processor broadcasts a pilot channel, a synchronization channel, or a common control channel for system information over the first or the second macrocell operating frequency in the beacon.

23. An apparatus for communicating a beacon for active hand-in, comprising:
   means for transmitting a pilot signal over a femto node operating frequency;
   means for generating a beacon to facilitate active hand-in of one or more devices communicating with one or more macrocell base stations; and
   means for determining: a first received signal strength indicator (RSSI) over a first macrocell operating frequency of the one or more macrocell base stations, a second RSSI over a second macrocell operating frequency of the one or more macrocell base stations, and a power for transmitting the beacon based at least in part on a relationship between the first RSSI and the second RSSI,
   wherein the means for transmitting broadcasts the beacon over the first or the second macrocell operating frequency of the one or more macrocell base stations different from the femto node operating frequency in accordance with the power.

24. The apparatus of claim 23, further comprising means for receiving one or more messages from the one or more macrocell base stations related to the active hand-in for the one or more devices based at least in part on the beacon.

25. The apparatus of claim 23, wherein the means for generating the beacon generates the beacon to comprise a pilot channel, a synchronization channel, or a common control channel for system information over the first or the second macrocell operating frequency.

26. A non-transitory computer-readable medium storing computer executable code for communicating a beacon for active hand-in, the computer executable code comprising:
   code for causing at least one computer to transmit a pilot signal over a femto node operating frequency;
   code for causing the at least one computer to generate a beacon to facilitate active hand-in of one or more devices communicating with one or more macrocell base stations;
   code for causing the at least one computer to determine: a first received signal strength indicator (RSSI) over a first macrocell operating frequency of the one or more macrocell base stations, a second RSSI over a second macrocell operating frequency of the one or more macrocell base stations, and a power for transmitting the beacon based at least in part on a relationship between the first RSSI and the second RSSI; and
   code for causing the at least one computer to broadcast the beacon over the first or the second macrocell operating frequency of the one or more macrocell base stations different from the femto node operating frequency in accordance with the power.

27. The computer-readable medium of claim 26, further comprising code for causing the at least one computer to receive one or more messages from the one or more macrocell base stations related to the active hand-in for the one or more devices based at least in part on the beacon.

28. The computer-readable medium claim 26, wherein the code for causing the at least one computer to broadcast further comprises code for broadcasting a pilot channel, a synchronization channel, or a common control channel for system information over the first or the second macrocell operating frequency in the beacon.

29. An apparatus for communicating a beacon for active hand-in, comprising:
   a communications component for transmitting a pilot signal over a femto node operating frequency;
   a beacon generating component for generating a beacon to facilitate active hand-in of one or more devices communicating with one or more macrocell base stations; and
   a beacon power determining component for determining: a first received signal strength indicator (RSSI) over a first macrocell operating frequency of the one or more macrocell base stations, a second RSSI over a second macrocell operating frequency of the one or more macrocell base stations, and a power for transmitting the beacon based at least in part on a relationship between the first RSSI and the second RSSI;
   wherein the communications component broadcasts the beacon over the first or the second macrocell operating frequency of the one or more macrocell base stations different from the femto node operating frequency in accordance with the power.

30. The apparatus of claim 29, further comprising a handover management component for receiving one or more messages from the one or more macrocell base stations related to the active hand-in for the one or more devices based at least in part on the beacon.

31. The apparatus of claim 30, wherein the handover management component transmits a handover command for performing the active hand-in for the one or more devices.

32. The apparatus of claim 31, wherein the handover management component determines to transmit the handover command based at least in part on comparing a received timing measurement or a received offset reported for a target femto node by the one or more devices to a timing measurement or an offset.

33. The apparatus of claim 31, wherein the handover management component compares the first or the second RSSI to a threshold to determine a presence of the one or more devices and determines to transmit the handover command where the first or the second RSSI is at least at the threshold.

34. The apparatus of claim 29, wherein the beacon generating component generates the beacon to comprise a pilot channel, a synchronization channel, or a common control channel for system information over the first or the second macrocell operating frequency.

35. The apparatus of claim 34, wherein the beacon comprises an identity of a femto node.

36. The apparatus of claim 35, wherein the identity of the femto node corresponds to a closed subscriber group (CSG) identity, a cell identity, or a primary scrambling code (PSC).

37. The apparatus of claim 36, wherein the beacon generating component receives the PSC from a femto gateway.

38. The apparatus of claim 35, wherein the identity of the femto node corresponds to a chip-level timing, a frame timing, or another observed timing with respect to the one or more macrocell base stations.

39. The apparatus of claim 29, wherein the beacon power determining component determines the power for transmitting the beacon based at least in part on a maximum transmit power for the beacon.

40. The apparatus of claim 39, wherein the beacon power determining component determines the maximum transmit power for the beacon based at least in part on determining a signal strength of the one or more macrocell base stations, or a desired signal strength for the beacon at a desired distance or desired pathloss.

41. The apparatus of claim 29, wherein the beacon generating component determines to broadcast the beacon based at least in part on determining the first or the second RSSI or a change in the first or the second RSSI over the first or the second macrocell operating frequency.

42. The apparatus of claim 41, wherein the beacon generating component determines to cease broadcast of the beacon based at least in part on determining another RSSI or another change in the another RSSI over another macrocell operating frequency.

43. The apparatus of claim 29, wherein the beacon generating component generates another beacon for broadcasting on another macrocell operating frequency different from the first or the second macrocell operating frequency and the femto node operating frequency.

44. The apparatus of claim 43, wherein the beacon generating component generates the another beacon to hop frequencies over a period of time for transmitting the another beacon.

45. An apparatus for communicating a beacon for active hand-in, comprising:
- a communications component for transmitting a pilot signal over a femto node operating frequency;
- a beacon generating component for generating a beacon to facilitate active hand-in of one or more devices communicating with one or more macrocell base stations; and
- a beacon power determining component for determining a power for transmitting the beacon based at least in part on determining a received signal strength indicator (RSSI) over a macrocell operating frequency of the one or more macrocell base stations,
- wherein the communications component broadcasts the beacon over the macrocell operating frequency of the one or more macrocell base stations different from the femto node operating frequency, and
- wherein the beacon power determining component decreases the power based at least in part on determining that the RSSI is over a threshold level.

46. An apparatus for communicating a beacon for active hand-in, comprising:
- a communications component for transmitting a pilot signal over a femto node operating frequency;
- a beacon generating component for generating a beacon to facilitate active hand-in of one or more devices communicating with one or more macrocell base stations; and
- a beacon power determining component for determining a power for transmitting the beacon based at least in part on determining a received signal strength indicator (RSSI) over a macrocell operating frequency of the one or more macrocell base stations,
- wherein the communications component broadcasts the beacon over the macrocell operating frequency of the one or more macrocell base stations different from the femto node operating frequency, and
- wherein the beacon power determining component decreases the power upon determining that no devices attempt connection within a threshold time after detecting an increase in the RSSI.

47. An apparatus for communicating a beacon for active hand-in, comprising:
- a communications component for transmitting a pilot signal over a femto node operating frequency;
- a beacon generating component for generating a beacon to facilitate active hand-in of one or more devices communicating with one or more macrocell base stations; and
- a beacon power determining component for determining a power for transmitting the beacon based at least in part on determining a received signal strength indicator (RSSI) over a macrocell operating frequency of the one or more macrocell base stations,
- wherein the communications component broadcasts the beacon over the macrocell operating frequency of the one or more macrocell base stations different from the femto node operating frequency, and
- wherein the beacon power determining component determines the power further based at least in part on a type of signal received over the macrocell operating frequency.

* * * * *